US011440656B2

(12) United States Patent
Smith et al.

(10) Patent No.: US 11,440,656 B2
(45) Date of Patent: Sep. 13, 2022

(54) COUNTERMEASURE DEPLOYMENT SYSTEM FACILITATING NEUTRALIZATION OF TARGET AERIAL VEHICLES

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 178 days.

(21) Appl. No.: 16/151,307

(22) Filed: Oct. 3, 2018

(65) Prior Publication Data

US 2020/0108925 A1   Apr. 9, 2020

(51) Int. Cl.
*B64C 39/02* (2006.01)
*F41H 11/02* (2006.01)
(Continued)

(52) U.S. Cl.
CPC ........... *B64C 39/024* (2013.01); *F41H 11/02* (2013.01); *G05D 1/101* (2013.01); *G05D 1/12* (2013.01);
(Continued)

(58) Field of Classification Search
CPC ........... B64C 39/024; B64C 2201/141; B64C 2201/08; B64C 2201/12; F41H 11/02;
(Continued)

(56) References Cited

U.S. PATENT DOCUMENTS 4,240,601 A * 12/1980 Reed .................... B64C 39/024
244/158.9
6,119,976 A * 9/2000 Rogers .................. B64C 39/024
244/13
(Continued)

FOREIGN PATENT DOCUMENTS

DE    102015003323 A1   9/2016
FR      2965908 A1   4/2012
(Continued)

OTHER PUBLICATIONS

International Search Report for International Application No. PCT/US2019/054552 dated Jan. 13, 2020, 20 pages.
(Continued)

*Primary Examiner* — Medhat Badawi
*Assistant Examiner* — Vicente Rodriguez

(57) ABSTRACT

A system for neutralizing target aerial vehicles comprises a projectile launching mechanism that launches a projectile that supports a counter-attack unmanned aerial vehicle (UAV) having an aerial vehicle countermeasure. The counter-attack UAV can be folded in the projectile, and operable to unfold when separated from the projectile. The system comprises an aerial vehicle detection system comprising a detection sensor that detects a target aerial vehicle. Upon detection, the projectile launching mechanisms launches the projectile, and the counter-attack UAV is thereafter separated from the projectile to operate in flight to neutralize the detected target aerial vehicle with the aerial vehicle countermeasure. The projectile launching mechanism can com-
(Continued)

prise a movable platform comprising a plurality of projectiles and counter-attack UAVs, and can comprise a detection sensor to detect target aerial vehicles.

45 Claims, 10 Drawing Sheets

(51) Int. Cl.
  *G05D 1/10* (2006.01)
  *G05D 1/12* (2006.01)
(52) U.S. Cl.
  CPC ...... *B64C 2201/08* (2013.01); *B64C 2201/12* (2013.01); *B64C 2201/141* (2013.01)
(58) Field of Classification Search
  CPC ... F41H 13/0087; F41H 13/0006; B64D 1/08; B64D 1/16; G05D 1/0094; G05D 1/101; G05D 1/12
  See application file for complete search history.

(56) References Cited

U.S. PATENT DOCUMENTS

| | | | |
|---|---|---|---|
| 6,392,213 B1* | 5/2002 | Martorana | B64C 39/024 244/13 |
| 8,146,855 B2* | 4/2012 | Ismailov | F42B 10/64 244/49 |
| 9,085,362 B1* | 7/2015 | Kilian | B64F 1/02 |
| 9,789,950 B1* | 10/2017 | Most | B64C 39/024 |
| 10,040,554 B1 | 8/2018 | Weinstein et al. | |
| 10,364,026 B1 | 7/2019 | Hanlon et al. | |
| 10,384,772 B2 | 8/2019 | Yamada et al. | |
| 10,663,266 B2 | 5/2020 | Banga et al. | |
| 10,689,109 B2 | 6/2020 | Wypyszynski et al. | |
| 10,926,875 B2 | 2/2021 | Klein | |
| 2009/0114761 A1 | 5/2009 | Sells, II | |
| 2009/0212157 A1 | 8/2009 | Arlton et al. | |
| 2010/0181424 A1 | 7/2010 | Goossen et al. | |
| 2012/0216697 A1* | 8/2012 | Jacobsen | F41B 9/0046 102/439 |
| 2014/0183300 A1 | 7/2014 | MacCulloch et al. | |
| 2015/0360797 A1 | 12/2015 | Melish et al. | |
| 2016/0023760 A1* | 1/2016 | Goodrich | G05D 1/12 244/10 |
| 2016/0117932 A1* | 4/2016 | Park | G05D 1/0202 701/3 |
| 2016/0250535 A1 | 9/2016 | Yatsko | |
| 2016/0251088 A1 | 9/2016 | Melish et al. | |
| 2016/0293015 A1* | 10/2016 | Bragin | G05D 1/12 |
| 2016/0376029 A1 | 12/2016 | Sekiya | |
| 2017/0057635 A1* | 3/2017 | Strayer | B64C 39/024 |
| 2017/0059692 A1 | 3/2017 | Laufer et al. | |
| 2017/0144756 A1 | 5/2017 | Rastgaar Aagaah et al. | |
| 2017/0205820 A1 | 7/2017 | Liu | |
| 2017/0225784 A1 | 8/2017 | Hayes et al. | |
| 2017/0253348 A1 | 9/2017 | Ashdown et al. | |
| 2017/0261292 A1 | 9/2017 | Armstrong et al. | |
| 2017/0261604 A1 | 9/2017 | Van Voorst | |
| 2017/0291704 A1 | 10/2017 | Alegria | |
| 2017/0355461 A1 | 12/2017 | Naito et al. | |
| 2017/0356726 A1 | 12/2017 | Theiss et al. | |
| 2017/0369169 A1 | 12/2017 | Lee et al. | |
| 2018/0162529 A1 | 6/2018 | Klein | |
| 2018/0162530 A1 | 6/2018 | Klein | |
| 2018/0164080 A1 | 6/2018 | Chi-Hsueh | |
| 2018/0197420 A1 | 7/2018 | Banga | |
| 2018/0224262 A1 | 8/2018 | Klein | |
| 2018/0237161 A1 | 8/2018 | Minnick et al. | |
| 2018/0244401 A1 | 8/2018 | Kilian et al. | |
| 2018/0257780 A1 | 9/2018 | Sassinsky | |
| 2018/0335779 A1* | 11/2018 | Fisher | B64C 39/024 |
| 2019/0025858 A1 | 1/2019 | Bar-Nahum et al. | |
| 2019/0063881 A1 | 2/2019 | Abramov et al. | |
| 2019/0068953 A1 | 2/2019 | Choi et al. | |
| 2019/0100315 A1 | 4/2019 | Theiss | |
| 2019/0112045 A1 | 4/2019 | Zhang | |
| 2019/0129427 A1 | 5/2019 | Sugaki et al. | |
| 2019/0176684 A1 | 6/2019 | Zych | |
| 2019/0176986 A1 | 6/2019 | Addonisio et al. | |
| 2019/0346241 A1 | 11/2019 | Metz et al. | |
| 2020/0108922 A1 | 4/2020 | Smith et al. | |
| 2020/0108923 A1 | 4/2020 | Smith et al. | |
| 2020/0108924 A1 | 4/2020 | Smith et al. | |
| 2020/0108926 A1 | 4/2020 | Smith et al. | |
| 2021/0188435 A1 | 6/2021 | Smith et al. | |

FOREIGN PATENT DOCUMENTS

| | | |
|---|---|---|
| KR | 10-2015-0145786 | 12/2015 |
| KR | 10-2017-0079782 | 7/2017 |
| WO | WO 2018/016017 A1 | 1/2018 |
| WO | WO 2018/112281 A1 | 6/2018 |

OTHER PUBLICATIONS

International Search Report for International Application No. PCT/US2019/054541 dated Jan. 14, 2020, 18 pages.
International Search Report for International Application No. PCT/US2019/054537 dated Jul. 16, 2020, 22 pages.
International Search Report for International Application No. PCT/US2019/054545 dated Jul. 24, 2020, 24 pages.
International Search Report for International Application No. PCT/US2019/054547 dated Jul. 24, 2020, 23 pages.
Airspace Systems Inc.; "Airspace LV"; Vimeo [online] [video]; vimeo.com; (Apr. 5, 2017); 2 pages; [retrieved on Oct. 2, 2018]; Retrieved from <URL: https://vimeo.com/211704482?from=outro-embed >.
Airspace Systems, Inc.; "Airspace"; airspace.co; (2016); 4 pages; [retrieved on Oct. 2, 2018]; Retrieved from <URL: http://airspace.co/#technology >.
Atherton; "This Drone Fires Nets to Catch Other Drones"; Popular Science; (Apr. 5, 2016); [retrieved on Oct. 2, 2018]; Retrieved from <URL: https://www.popsci.com/drone-fires-nets-to-catch-other-drones >.
Dedrone; "Dedrone Videos"; dedrone.com; (2018); 3 pages; [retrieved on Oct. 2, 2018]; Retrieved from <URL: https://www.dedrone.com/products/videos >.
Fortem Technologies; "Fortem DroneHunter™TM Demonstration"; YouTube [online] [video]; YouTube.com; (Sep. 24, 2017); 1 page; [retrieved on Oct. 2, 2018]; Retrieved from <URL: https://www.youtube.com/embed/BsFXLPFzK-4 >.
Groupe Assmann; "Drone Interception"; YouTube [online] [video]; YouTube.com; (Dec. 12, 2014); 2 pages; [retrieved on Oct. 2, 2018]; Retrieved from <URL: https://youtu.be/APWG3VEGbJw >.
Moseman; "This Drone Interceptor Captures Your Pathetic Puny Drone With a Net"; Popular Mechanics; (Feb. 11, 2015); 6 pages; [retrieved on Oct. 2, 2018]; Retrieved from <URL: http://www.popularmechanics.com/flight/drones/a14032/france-dispatches-a-net-carrying-bully-drone-to-catch/ >.
Openworks Engineering Ltd.; "Sky Wall"; Openworks Engineering; [brochure]; (2017); 15 pages; <URL: https://openworksengineering.com/skywall >.
Starrs; "To Catch a Drone, Use a Net"; The Washington Post (WP Company LLC); Jan. 15, 2016); 3 pages; [retrieved on Oct. 2, 2018]; Retrieved from <URL: https://www.washingtonpost.com/news/morning-mix/wp/2016/01/15/watch-a-drone-catcher-net-a-rogue-drone/?utm_term=.63257596ca17 >.

* cited by examiner

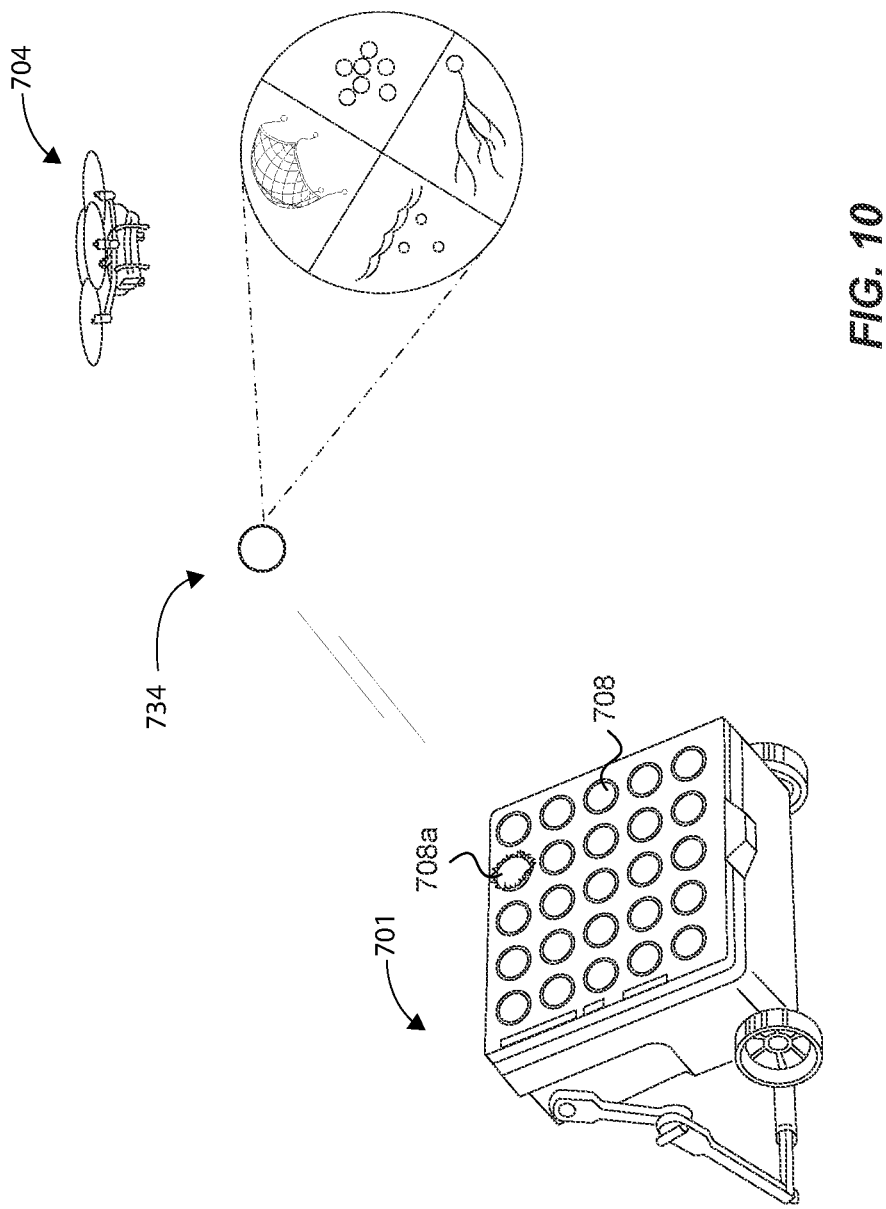

COUNTERMEASURE DEPLOYMENT SYSTEM FACILITATING NEUTRALIZATION OF TARGET AERIAL VEHICLES

BACKGROUND

Unmanned aerial vehicles (UAVs), such as rotary drones and fixed-wing drones, have been increasingly popular with consumers in the past decade. This popularity, coupled with their constantly improving performance capabilities, pose threats in terms of collisions with other aerial vehicles or structures, whether accidental or deliberate terrorist attacks on high-value targets, such as government complexes, international airports, nuclear power plants, petrochemical facilities, water reservoir, and other highly-populated or critical infrastructure. Factors that contribute to such threats are the high rate of speed of drones, their small signature, and the possibility of simultaneous, coordinated attacks from a number of attacking drones. These factors are exacerbated by the fact that drones are relatively inexpensive, highly portable, and highly maneuverable. Moreover, consumer drones are dramatically improving in terms of endurance, range, and payload transport capabilities (e.g., some consumer drones can carry 10+ kilograms, which is enough to carry explosives, projectiles, and/or chemical weapons). In many cases, a drone operated for a deliberate attack can be launched and flown into a protected perimeter within just a few seconds, which leaves minimal time to detect and neutralize the attacking drone.

With all these considerations in mind, one or more inexpensive adversarial drones can be autonomously or manually flown into a protected area while potentially causing a large amount of damage and/or harm, all at a very low cost and effort by an amateur programmer/operator. Counteracting such threats with existing technologies can be very costly and complex, particularly when trying to protect a relatively large airspace associated with hundreds of acres or square kilometers of a property.

BRIEF SUMMARY OF THE INVENTION

The present disclosure sets forth a system for neutralizing a target aerial vehicle, comprising a projectile launching mechanism; a projectile launchable by the projectile launching mechanism; and a counter-attack unmanned aerial vehicle (UAV) supported by and separable from the projectile, and comprising an aerial vehicle countermeasure, wherein, upon detecting a target aerial vehicle, the projectile launching mechanisms is operable to launch the projectile, and wherein upon separation from the projectile the counter-attack UAV is operable to neutralize the target aerial vehicle with the aerial vehicle countermeasure.

The counter-attack UAV can be configured in a folded position within the projectile for aerial transport of the counter-attack UAV to the pre-determined location. The counter-attack UAV can be operable to move to an unfolded position upon separation from the projectile.

The counter-attack UAV can be released from the projectile at a pre-determined location comprising an aerial position relative to the target aerial vehicle, such that the counter-attack UAV is undetectable by a sensor of the target aerial vehicle.

The projectile can comprise a first housing section and a second housing section releasably coupled to each other and defining an inner chamber that contains the counter-attack UAV in a folded position. The projectile can further comprise a housing release mechanism configured to at least partially separate the first housing section from the second housing section to expose the inner chamber, thereby facilitating separation and release of the counter-attack UAV from the projectile.

The present disclosure also sets forth a system for detecting and neutralizing a target aerial vehicle, comprising a projectile launching mechanism; a projectile launchable from the projectile launching mechanism to a pre-determined location; a counter-attack unmanned aerial vehicle (UAV) supported by and separable from the projectile and comprising an aerial vehicle countermeasure; and an aerial vehicle detection system comprising at least one detection sensor operable to detect a target aerial vehicle while in flight, wherein, upon detecting the target aerial vehicle, the projectile launching mechanism operates to launch the projectile to the pre-determined location, and wherein upon separation from the projectile, the counter-attack UAV is operable to neutralize the target aerial vehicle via the aerial vehicle countermeasure.

The present disclosure further sets forth a method for neutralizing a target aerial vehicle comprising detecting a target aerial vehicle while in flight; launching a projectile from a projectile launching mechanism, the projectile supporting a counter-attack unmanned aerial vehicle (UAV); separating the counter-attack UAV from the projectile; and operating the counter-attack UAV to neutralize the target aerial vehicle. Separating the counter-attack UAV from the projectile can further comprise operating a housing release mechanism to release the counter-attack UAV at a pre-determined location relative to a detected position of the target aerial vehicle.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 10 illustrates a projectile launching mechanism that is launching an aerial vehicle countermeasure to neutralize a target aerial vehicle in accordance with another example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

To further describe the present technology, examples are now provided with reference to the figures.

Figure 1:
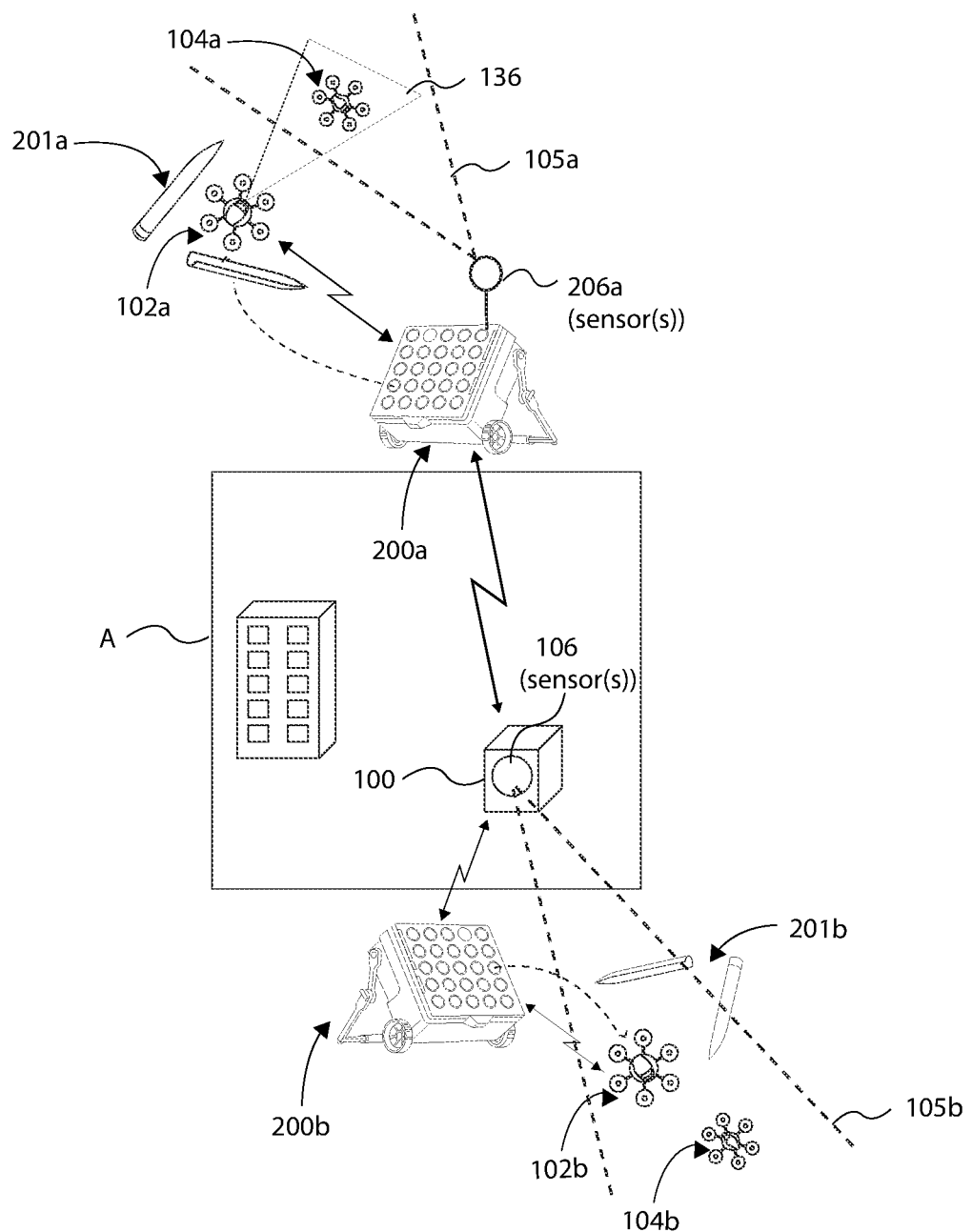
FIG. 1 is an illustration that graphically and schematically shows a system for detecting and neutralizing target aerial vehicles with counter-attack UAVs launched from projectile launching mechanisms in accordance with an example of the present disclosure.

FIG. 1 schematically and graphically illustrates a system and method for protecting an airspace area A with an external aerial vehicle detection system, such as example ground-based external aerial vehicle detection system 100 and/or projectile launching mechanisms 200a and 200b, operable with one or more counter-attack UAVs, such as example UAVs 102a and 102b (it is noted that any number of counter-attack UAVs can be operable with the aerial vehicle detection system 100). The external aerial vehicle detection system 100 and/or projectile launching mechanisms 200a and 200b can be configured to communicate with at least one of the counter-attack UAV(s) 102a and 102b for the purpose of neutralizing one or more target aerial vehicle(s) (e.g., see target aerial vehicles 104a and 104b) that may be encroaching or approaching the airspace area A, and that are determined to be a threat to the airspace area A.

Figure 2:
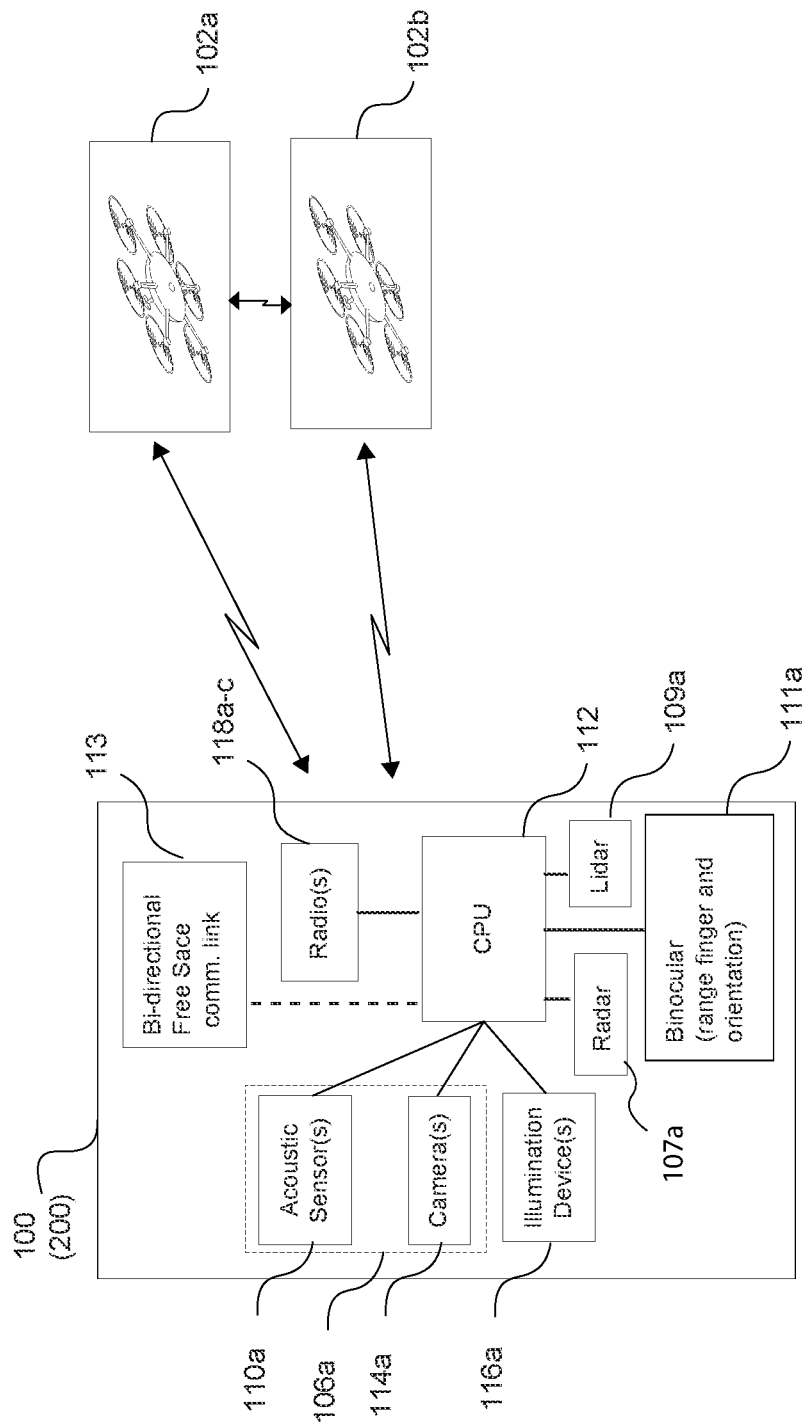
FIG. 2 is a block diagram that illustrates possible detection and communication features of the system of FIG. 3 in accordance with an example of the present disclosure.
Figure 3:
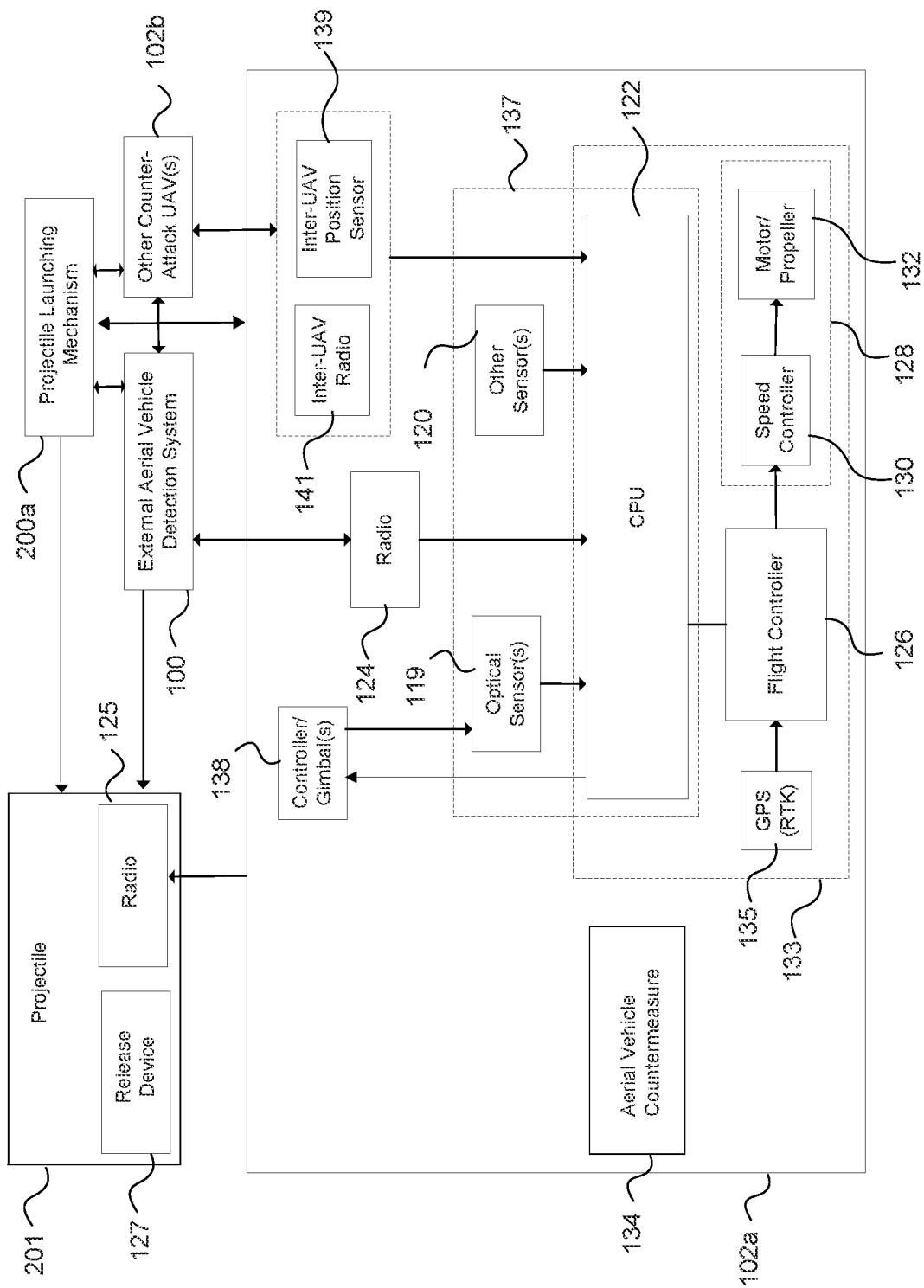
FIG. 3 is a block diagram that illustrates possible detection and operation features of a counter-attack UAV, such as shown in FIGS. 1 and/or 2, in accordance with an example of the present disclosure.

FIG. 2 is a block diagram that illustrates the components of the external aerial vehicle detection system 100 (and projectile launching mechanisms 200a and 200b) and its ability to perform detecting and real-time tracking of the target aerial vehicle(s) 104a and 104b shown in FIG. 1, and to communicate command data to the counter-attack UAV(s) 102a and 102b. The command data can include any data relevant to facilitate capture of the target UAV, including, but not limited to, data pertaining to the location of the target UAV. FIG. 3 is a block diagram that illustrates a control system of the counter-attack UAV 102a (and 102b) for neutralizing one or more of the target aerial vehicles 104a, and how the control system is operable with the external aerial vehicle detection system 100 and/or the projectile launching mechanisms 200a (and another counter attack UAV 102b).

As an overview, and in one example with particular reference to FIGS. 1 and 2, the system can comprise the external aerial vehicle detection system 100 and/or projectile launching mechanisms 200a and 200b, that can each be configured to detect and track incoming target aerial vehicle(s) 104a and 104b that may be a threat to infrastructure and/or assets within an airspace area A (e.g., buildings, commercial airplanes, utilities, personnel). The external aerial vehicle detection system 100 and/or projectile launching mechanisms 200a and/or 200b can each be configured to obtain and communicate information about the detected target aerial vehicle(s) 104a and 104b, such as their tracked position(s) periodically over time or in real-time, their altitude, their trajectory, their velocities, and any other sensed or acquired information pertaining to the target aerial vehicle(s) 104a and 104b. Once obtained, this information can be communicated to at least one or a plurality of counter-attack UAV(s) 102a or 102b, or both, so that the counter-attack UAV(s) 102a and 102b can utilize an aerial vehicle countermeasure to neutralize the target aerial vehicle(s) 104a and 104b, as further detailed below (see e.g., entangling elements 134 of FIG. 5).

As will be further discussed below regarding FIGS. 4A-9, upon detecting the target aerial vehicle 104a, the projectile launching mechanism 200a can be operated to launch a projectile 201a that supports or houses the counter-attack UAV 102a during flight. At a specific, pre-determined time or position, the counter-attack UAV 102a can then be separated or released from the projectile 201a, and then the counter-attack UAV 102a can take flight to intercept and neutralize the target aerial vehicle 104a, such as further detailed below. The same can be said for the projectile launching mechanism 200b that launches the projectile 201b that supports or houses the counter-attack UAV 102b.

The target aerial vehicles 104a and 104b can be any type, such as, but not limited to, unmanned single or multi-rotor UAVs or fixed-wing UAVs (or tilt rotor UAVs) that can be operated autonomously or manually. As mentioned, target aerial vehicles 104a and 104b (e.g., multi-rotor UAVs) can be significant threats because they can ascend/descend vertically up to several kilometers in airspace, can hover for many minutes, are extremely agile, fast, and maneuverable around obstacles, have small visual/IR/radar signatures, and can transport substantial payloads. Therefore, quickly detecting and tracking their positions and velocities within a relatively short timeframe (e.g., a few seconds) is critical to effectively prevent breach of the airspace area A, and more importantly to protect assets associated with the monitored airspace area A.

The external aerial vehicle detection system 100 can be supported by or associated with a ground-based structure, a vehicle (e.g., land, sea, or air), a movable platform, or other platform that can support a number of components discussed herein as associated with the external aerial vehicle detection system 100. The external aerial vehicle detection system 100 can comprise a number of sensors or platforms spaced apart from each other around an area or about different structures, and that can each be communicatively coupled to each other and/or a central computer system for controlling gimbals, for pointing positions, for processing data associated with target aerial vehicle(s), and for communicating command data to one or more counter-attack UAVs. Note that a plurality of aerial vehicle detection systems (e.g., 100) can be incorporated around an area to protect a larger airspace, and which can each have a computer system communicatively coupled to the computer systems of the other aerial vehicle detection systems to cooperatively monitor and protect a given airspace.

As more particularly shown in FIG. 2, the external aerial vehicle detection system 100 can comprise at least one detection sensor 106a (where, although not shown, up to n (any) number of detection sensors are contemplated, as will be appreciated by those skilled in the art) operable to collect and generate data associated with the target aerial vehicle(s) 104a and 104b (e.g., velocity, geolocation, altitude, trajectory or flight path, and others). For example, the detection sensor(s) 106a can comprise one or more acoustic sensor, such as acoustic sensor 110a, and one or more cameras, such as camera 114a that are operable to collect and generate data associated with the target aerial vehicle(s) 104a-n. The detection sensor(s) 106a can comprise other target acquisition assets, such as radar device(s) 107a, LIDAR device(s) 109a, and/or binocular(s) 111a, each coupled to a CPU 112 and having the capability to measure azimuth elevation/tilt angle of a target aerial vehicle. The detection sensor(s) 106a can further comprise other sensors, such as electromagnetic signature sensors used to detect a target aerial vehicle prior to taking-off, or cameras operating over a different portion of the electromagnetic spectrum from LWIR to SWIR to visible. Other possible sensors include narrow band light emitters with detectors (e.g., cameras) that have their detection band closely matched to those of the light emitters, and/or other sensors such as narrow band light emitters (e.g., UV sources) that may make portion the target fluoresce in a different portion of the electromagnetic spectrum facilitating its detection. Note that the detection sensor(s) 106a may be able to detect multiple target aerial vehicles at the same time, wherein the CPU 112 (or multiple CPUs) can be configured to determine which sensor(s) is/are most credible or reliable for target aerial vehicle(s), and then configured to assign one or more of such sensor(s) to continue to track and monitor the target aerial vehicle(s) while un-assigning other sensor(s) from tracking particular target aerial vehicle(s). This concept is further discussed below regarding the "credibility hierarchy".

Note that the projectile launching mechanisms 200a and/or 200b can have the all of the same or similar features as described regarding the external aerial vehicle detection system 100, and therefore the projectile launching mechanism 200a, for instance, may be considered an on-platform external vehicle detection system because it can comprise and support one or more detection sensor(s) 206a and a number of other components (see e.g., FIG. 2), and that are operable to detect and track target aerial vehicle(s), as further detailed herein. And, the external vehicle detection system 100 can be considered a ground-based external vehicle detection system because it can be associated with a ground-based structure.

In some examples, the acoustic sensor(s) 110a can comprise one or more of microphones that can detect and track target aerial vehicle(s) 104a and 104b at a large distance (e.g., up to 500 meters, or more). A database of UAV signatures can be obtained or built and accessed by a CPU 112 of the aerial vehicle detection system 100 to determine the existence and type of the detected target aerial vehicle(s) 104a and 104b. In this manner, the CPU 112, utilizing a processor, can eliminate or ignore the signatures of any (friendly) counter-attack UAV(s) 102a and 102b that may be in flight while detecting the signatures of target aerial vehicle(s) 104a and 104b (assuming the "friendly" and "enemy" UAVs are different types of UAVs, or that the CPU 112 is programmed to differentiate between the two, such as based on known positions of counter-attack UAVs).

In some examples, one or more sensors or cameras 114a (e.g., IR, optical, CCD, CMOS) can be incorporated as one or more of the detection sensors 106a (and/or sensor 206a of projectile launching mechanism 200a) of the external aerial vehicle detection system 100. For instance, infrared (IR) camera(s) can be implemented into the system and directed toward a particular airspace for viewing possible incoming target aerial vehicles. IR cameras are useful in this system because they can assist to overcome environmental problems experienced by other sensors (e.g., optical cameras), because IR cameras can operate in the dark or in foggy, dusty, or hazy conditions. IR cameras utilized in this system have the additional advantage that the IR signal from a target aerial vehicle (e.g., a UAV) is very different from that of birds in flight. IR cameras based on the shortwave infrared (SWIR) spectrum can interact with objects in a similar manner as visible wavelengths, as it is reflective, bouncing-off objects. As a result, SWIR light has shadows and contrast in its imagery. Images from a SWIR camera are comparable to visible images in resolution and detail. An atmospheric phenomenon called night sky radiance or night glow emits five to seven times more illumination than starlight, nearly all of it in the SWIR wavelengths. Because of this, SWIR cameras can see objects with great clarity on moonless nights. Such SWIR camera(s) can be incorporated into the present external aerial vehicle detection system 100 (and/or into the counter-attack UAV(s)). Longwave infrared (LWIR) cameras are more optimal for outdoor use because they are less affected by radiation from the Sun than with SWIR cameras. As such, LWIR camera(s) can be incorporated into the external aerial vehicle detection system 100 to benefit from the advantages of outdoor use to detect and track target aerial vehicle(s). Other camera(s), such as optical cameras (e.g., HD, 4K), can also be incorporated as detection sensor(s) 106a of the external aerial vehicle detection system 100 to assist with detection and tracking the position of target aerial vehicle(s) 104a and 104b.

In some examples, one or more telephoto lenses can be operable and incorporated with one or more of the SWIR and LWIR camera(s), and/or optical camera(s), and can be mounted on high-resolution motorized gimbals (e.g., 2 or 3-axis gimbals) associated with the external aerial vehicle detection system 100 (and/or the projectile launching mechanism 200a) to assist with detecting and tracking the dynamic position(s) of target aerial vehicle(s) 104a and 104b, including the angular position and/or azimuth elevation, in some cases depending on the type of sensor employed. Two or more detection sensors described herein can be used to compute range of a target aerial vehicle. Moreover, a particular camera (e.g., IR, optical) can be used in conjunction with an on-board (or remotely supported) laser range finder to determine the position of the target aerial vehicle in three-dimensional space (e.g., distance, azimuth angle, and elevation angle). Such telephoto lenses and gimbals can each be operated to establish the pointing position (and to dynamically modify the pointing position)

of the associated camera, and therefore adjust a field-of-view (FOV) 105a (FIG. 1) of a particular camera (e.g., a sensor 206a) to keep a monitored target aerial vehicle 104a centered about the camera (the same is true for target aerial vehicle 104b being centered about a FOV 105b of a camera or sensor of the external vehicle detection system 100). These telephoto lenses and gimbals can be operated manually or autonomously (discussed below) to continuously track a dynamic flight position or path of a particular target aerial vehicle. In one example, a 360-degree camera device (having IR or optical camera(s)) could also be integrated with the external aerial vehicle detection system 100 (and/or the projectile launching mechanism 200a) to monitor an entire 360-degree air space, which may or may not require a gimbal for operation to monitor such airspace.

Computer vision algorithms stored and processed by the CPU 112 of the external aerial vehicle detection system 100 (and/or the projectile launching mechanism 200a) can be implemented for automatic detection and tracking of the target aerial vehicle(s) 104a and 104b. Such computer vision algorithms can "pull" a moving object out of a static background and classify it by shape (i.e., feature detection). Other mechanisms for classification of target aerial vehicle(s) 104a and 104b include using neural networks, which are computer algorithms designed to mimic the workings of the human brain, that are trained to recognize known/stored images of profiles that may be similar to the particular detected target aerial vehicle(s) 104a and 104b. Those skilled in the art will recognize that various known algorithms can be implemented to achieve this functionality, including "convolutional neural network" (CNN) combined with fast detection, such as provided by the You Only Look Once (YOLO) detection architecture known in the industry. Once the target aerial vehicle(s) are detected by the computer vision system (e.g., CNN, YOLO), the gimbal orientation supporting the camera can be used to determine azimuthal and elevation of the target aerial vehicle. Information from multiple computer vision systems may be combined to calculate range in addition to azimuthal and elevation angle. The target classification and position information collected using the computer vision system can further be combined/fused with information collected from other sensor(s) (e.g., 106a) to increase the likelihood of detection, and/or accuracy of classification of the target aerial vehicle, and/or tracking of the position of the target aerial vehicle.

In some examples, Phase-Based Video Motion processing technology can be incorporated with the external aerial vehicle detection system 100 (e.g., software processed by the CPU 112). Phase-Based Video Motion processing technology amplifies very small motions that otherwise could not be detected. This technology is further described in U.S. Patent Pub. No. US20170000356A1 filed Jul. 1, 2015, which is incorporated by reference herein. Thus, small vibration motions inherent to target aerial vehicles (e.g., UAVs) can be detected, which can overcome the issues with using only cameras to detect and track target aerial vehicles. For instance, as similarly discussed in U.S. Patent Pub. No. US20170000356A1, a method executed by a processor (e.g., CPU 112) receives a video as input (e.g., video of a target aerial vehicle) and exaggerates subtle changes and micromotions. To amplify motion, the method does not perform feature tracking or optical flow computation, but merely magnifies temporal changes using spatio-temporal processing. This Eulerian based method, which temporally processes pixels in a fixed spatial region, reveals informative signals and amplifies small motions in real-world videos.

The Eulerian-based method begins by examining pixel values of two or more images. The method then determines (with the processor) the temporal variations of the examined pixel values. The method is designed to amplify only small temporal variations. While the method can be applied to large temporal variations, the advantage in the method is provided for small temporal variations, such as when a target aerial vehicle is detected at long ranges. Therefore, the method can be optimized when the input video has small temporal variations between the images of a particular target aerial vehicle while in flight. The method can then apply signal processing to the pixel values. For example, signal processing can amplify the determined temporal variations, even when the temporal variations are small, such as vibrations of a target aerial vehicle as captured in successive images by an optical sensor of an external vehicle detection system of the present disclosure.

Once the target aerial vehicle(s) 104a and 104b have been identified in successive frames of video (e.g., using IR and/or 4K optical cameras, and/or other sensors such as Radar), autonomously tracking a dynamic flight position or path of the target aerial vehicle(s) 104a and 104b and fusing position information provided by different sensing methodology (e.g., camera and Radar) can be performed by utilizing a Kalman filter, extended Kalman filter, particle filters, or another variation of a Bayesian filter. These filters work by taking an estimate of the velocity, position, and orientation of the particular target aerial vehicle 104a, for instance, and then predicting where the target aerial vehicle 104a will be in the next frame of video. Then, the position of the target aerial vehicle 104a in the next video frame is compared with the predicted position, and the estimates for the velocity, position, and orientation are updated. During such tracking with one of the cameras 114a, a feedback control loop can autonomously and continually adjust the gimbal (supporting the particular camera) to keep the target aerial vehicle 104a centered about the FOV 105a of the camera of the projectile launching mechanism 200a (or the external aerial vehicle detection system 100, as the case may be). This facilitates or maintains continuous tracking of a dynamic flight position of a particular target aerial vehicle. Common algorithms include centroid tracking, edge detection, feature-based algorithms, and area correlation tracking. Using this system of cameras and filters, the external aerial vehicle detection system 100 and/or the projectile launching mechanism 200a can detect and track, in real-time, a flight position or path of a particular target aerial vehicle.

Indeed, a number of detection sensors 106a can be positioned about a structure or platform of the external aerial vehicle detection system 100 in a manner that the detection sensors 106a can cooperatively and collectively monitor a perimeter of up to 360 degrees associated with an airspace around the position of the external aerial vehicle detection system 100 to protect an area (e.g., a 500+ meter radius of coverage of an airspace). Alternatively, the detection sensors 106a can be mounted and configured to point toward a particular area of interest less than 360 degrees of coverage, such as through a canyon, or other particular egress of importance relative to the protected area A.

In some examples, the external aerial vehicle detection system 100 can comprise at least one illumination device (see illumination device 116a), such as a laser or high-powered LED, operable to illuminate the detected target aerial vehicle(s) 104a and 104b. A particular illumination device 116a can be mounted on a gimbal device (e.g., 3-axis) that is operable to modify a pointing position or direction of the illumination device to continuously direct the illumination device toward the target aerial vehicle 104a, for instance, for constant illumination. In this manner, a controller (operatively coupled to the CPU 112) can be operated to control said pointing position based on the tracked position or flight path of the target aerial vehicle 104a. As will be discussed below, the counter-attack UAVs 102a and/or 102b can have a band pass filter (on a camera) to detect only the narrow frequency of band light illuminated onto the target aerial vehicle 104a and/or 104b by the illumination device 116a of the external aerial vehicle detection system 100.

In another example of a detection sensor of the external aerial vehicle detection system (100), a telescope or a pair of human use binoculars equipped with azimuthal and elevation angle sensors may be used to locate a potential target aerial vehicle and transmit partial position information to the counter-attack UAV(s) (and/or to a CPU of the external aerial vehicle detection system). In another example, the telescope or binocular based detection system can be equipped with a range sensor, such as a laser range finder, and the information provided by this range sensor can be combined with that provided by the azimuthal and elevation angle sensors, thereby allowing the position of the target UAV to be tracked in 3D.

Once the target aerial vehicle 104a is detected as entering a monitored airspace (e.g., within a 500 m radius of the projectile launching mechanism 200a), the projectile launching mechanism 200a (or the external vehicle detection system 100) can transmit command data to the counter-attack UAV 102a for purposes of neutralizing the target aerial vehicle 104a with a particular aerial vehicle countermeasure (e.g., monofilament fibers). The command data can be generated by the CPU 112 and transmitted via a radio 118a to the counter-attack UAV 102a, whether during flight or while still inside the projectile 201a. Optionally, a bi-directional free space communication link 113 can be utilized in replacement of (or to supplement) radios 118a-c. The command data can include location data, and can be associated with the detected position of the target aerial vehicle 104a, which can include a flight path, altitude, longitude, latitude, GPS coordinates (degrees, minutes, seconds), and/or other data associated with a spatial position and/or velocity of the target aerial vehicle 104a. The command data can also include intercept data, such as information or instructions that command the counter-attack UAV 102a to fly at a certain velocity to intercept, capture, and/or neutralize the target aerial vehicle 104a, as further exemplified below.

To "intercept" can mean that a counter-attack UAV, such as counter-attack UAV 102a (and/or 102b) is flown into a position relative to a target aerial vehicle (for example, target aerial vehicle 104a) that permits the counter-attack UAV 102a to perform a neutralizing function with respect to the target aerial vehicle 104a. This can include, but is not limited to, flying the counter-attack UAV 102a into a projected flight path of the target aerial vehicle 104a, or along a flightpath offset from, but proximate the target aerial vehicle 104a, or to a position proximate the target aerial vehicle 104a, or along a flightpath behind the target aerial vehicle 104a, or along any other flight path or to any position where the counter-attack UAV 102a is in close proximity to the target aerial vehicle 104a.

The command data transmitted to the counter-attack UAV 102a by the projectile launching mechanism 200a (and/or the external aerial vehicle detection system 100) can also include aerial vehicle countermeasure deployment command data, such as information or instructions that instruct or command the counter-attack UAV 102a to fly to a particular location, direction, and time, for instance. The command data can further include target aerial vehicle detection data, such as position data or information (discussed above), and even information other than position information, such as identification information about the type of UAV of the target aerial vehicle(s) 104a detected by the detection sensor(s) 106a (and/or 206a). Such information can aid the external aerial vehicle detection system 100 (and/or the projectile launching mechanisms and/or the counter-attack UAV(s) 102a) to determine the size, type (e.g., fixed or rotary wing), on-board features, and/or performance capabilities of a particular target aerial vehicle, for instance, which can affect the aspects of neutralizing the target aerial vehicle, such as when to release the counter-attack UAV 102a from the projectile 201a, for instance, and when/where to launch or operate a particular countermeasure, as further detailed below.

The command data can also include counter-attack UAV control data, which can include instructions for controlling some or all aspects of the counter-attack UAVs 102a and/or 102b. In this manner, the counter-attack UAVs 102a and/or 102b can be "dummy" drones that have disabled or overridden internal flight controls, so that the external aerial vehicle detection system 100 (and/or the projectile launching mechanism(s)) can control flight, sensor pointing, etc. of a particular counter-attack UAV. Therefore, the external aerial vehicle detection system 100 (and/or the projectile launching mechanism 201a) can detect and monitor the position or flight path of a target aerial vehicle with one detection sensor and processing unit, while also monitoring and controlling the respective positions and operation of counter-attack UAV(s) 102a and/or 102b.

Using at least some of such command data, the projectile launching mechanism 201a can be operated to autonomously launch the projectile 201a (and the supported counter-attack UAV 102a) at a particular time and direction, and then autonomously separate the counter-attack UAV 102a from the projectile 201a, as further detailed below. Then, the counter-attack UAV 102a can be operated autonomously to intercept and neutralize the target aerial vehicle 104a. This system discussed regarding FIGS. 1 and 2 are particularly advantageous in cases where the target aerial vehicle(s) 104a and/or 104b may be several kilometers away from the airspace area A, and even several kilometers in altitude. This is because it may be difficult for an individual counter-attack UAV to know where to "look" in a plausibly large amount of airspace and at possible long ranges. This is because many on-board cameras of a counter-attack UAV can only detect, identify, and classify targets at larger ranges (e.g., greater than 100 m), if the FOV is significantly reduced (e.g., 10 degrees or less). In addition, the flight time of the counter-attack UAV's can be extended as the projectile launching mechanism is capable of launching and positioning the counter-attack UAV into a position closer to the target aerial vehicle before the counter-attack UAV is required to fly on its own using its own power.

As discussed above, the external aerial vehicle detection system 100 can operate the plurality of detection sensors (e.g., two or more of detection sensors 106a) to generate position data associated with a target aerial vehicle. The CPU 112 can then operate to eliminate position data associated with one or more of the detection sensors based on a credibility hierarchy associated with the plurality of detection sensors. Such credibility hierarchy can be based on environmental conditions. For instance, when operating during daytime and with no clouds, the credibility hierarchy could include position data derived from the following list of prioritized detection sensors: (1) an optical camera, (2) binoculars, (3) IR camera(s), (4) a radar device, (5) a LIDAR device, (6) an acoustic sensor, (7) an illumination device, and (8) other sensors. More specifically, once the CPU 112 has determined or knows of such environmental conditions, the CPU 112 can eliminate position data associated with sensors 3 through 7 (and/or un-assign such sensors from operating), while using position data generated from (1) the optical camera and (2) the binoculars (e.g., assigned detection sensors). Ideally, position data generated from the optical camera(s) would be the most credible during daytime in daylight without clouds, birds, etc. However, if signals generated from (2) the binoculars are more credible for any particular reason (e.g., the binoculars have less intermittent signal loss than the optical camera), then the CPU 112 can eliminate the position data generated from the optical camera, and use the position data generated from the binoculars, and then communicate the position data to one or more counter-attack UAVs. Such processing of eliminating certain position data can occur many times per minute, so that the best tracking information is generated and processed by the external vehicle detection system 100 for transmitting to the counter-attack UAVs, thereby improving or increasing the chances of intercepting and capturing the detected target aerial vehicle(s).

In another example of credibility hierarchy, assume the operating conditions are at night and with cloud cover, such that very little light is emitted to an area to be monitored by the external vehicle detection system 100. Here, the credibility hierarchy may be as follows: (1) IR camera(s), (2) an acoustic sensor, (3) a radar device, (4) a LIDAR device, (5) an illumination device, (6) other sensors, (7) optical camera, and (8) binoculars. This is because at night, IR camera(s) may generate the most credible position data, as discussed above. Thus, the CPU 112 can eliminate position data generated from detection sensors 4 through 8, and then analyze the signals generated from detection sensors 1 through 3 to determine the most credible position data generated. For instance, if the acoustic sensor is getting interference from other sounds, and if the radar device is affected by weather pattern, then the CPU may only use position data from the IR camera(s) as the most credible position data (and only data) for transmitting to the counter-attack UAV(s) to increase the chances of intercepting and capturing the detected target aerial vehicle(s).

It should be appreciated by those skilled in the art that the CPU 112 can include a tangible and non-transitory computer readable medium comprising one or more computer software modules configured to direct one or more processors to perform the method steps and operations described herein.

As illustrated in FIG. 3, a particular counter-attack UAV (e.g., counter-attack UAV 102a) can comprise one or more optical sensors (e.g., see optical sensor 119), and/or other detection sensors 120. The optical sensors 119 and the other sensors 120 can be operatively coupled to a CPU 122 for processing data generated by the optical sensors 119 and the other sensors 120 associated with the presence or position of the target aerial vehicle 104a, for instance.

The counter-attack UAV 102a can further comprise a wireless communication device, such as a radio 124 (e.g., Sik telemetry radio), that can wirelessly receive the command data from the external aerial vehicle detection system 100 and/or the projectile launching mechanism 200a, and then can transmit the command data to the CPU 122 for processing. The radio 124 can be used to communicate a video feed, captured by the optical sensor(s) 119, back to the external aerial vehicle detection system 100 and/or to the projectile launching mechanism 200a (or to another external computer system, or even to a manually-monitored display).

Based on the received command data, the counter-attack UAV 102a can operate autonomously to fly in a particular direction and velocity to move and/or deploy the aerial vehicle countermeasure device 134, based on a particular tracked flight path the target aerial vehicle 104a, to capture (or otherwise neutralize) the target aerial vehicle 104a with the aerial vehicle countermeasure device 134. More specifically, the counter-attack UAV 102a can comprise a flight controller 126 coupled to the CPU 122 for receiving command signals associated with the command data processed by the CPU 122. The flight controller 126 can then control the various rotor assemblies (e.g., see rotor assembly 128) that each comprises an electronic speed controller 130 and a motor/propeller 132 to cause the counter-attack UAV 102a to move to a particular position and/or at a certain velocity to appropriately move the aerial vehicle countermeasure device 134 along or to a particular flight path. Thus, the CPU 122, the flight controller 126, and the rotor assemblies 128 can define a flight control system 133 that is operable to facilitate flight of the counter-attack UAV 102a to properly position of the aerial vehicle countermeasure device 134, as further described herein (or for the counter-attack UAV to launch a particular aerial vehicle countermeasure device toward a target aerial vehicle, such as described regarding FIGS. 6, 7, and 9).

Updated command data can be continuously communicated to the counter-attack UAV 102a so that the flight controller 126 can control flight of the counter-attack UAV 102a, as corresponding to a tracked flight path or position of the target aerial vehicle 104a. In this manner, the counter-attack UAV 102a can intercept the target aerial vehicle 104a, and can then neutralize the target aerial vehicle 104a with the aerial vehicle countermeasure 134 (e.g., filaments) coupled to or supported by the counter-attack UAV 102a, such as further exemplified below regarding FIG. 5. This is also applicable to the other example aerial vehicle countermeasures discussed herein, namely that a particular counter-attack UAV can be flown to a particular position or along a flight path that is in close proximity to a detected target aerial vehicle for purposes of neutralization.

The optical sensors 119 (and/or the other sensors 120) and the CPU 122 can define an on-board aerial vehicle detection system 137 that is operable to detect the target aerial vehicle 104a on its own, in one example (e.g., without the assistance of an external aerial vehicle detection system). Thus, the counter-attack UAV 102a can detect the target aerial vehicle 104a (assuming it is within range), and then the CPU 122 can generate command data, and then transmit signals associated with the command data to the flight controller 126 to facilitate flight of the counter-attack UAV 102a (whether such flight is static for maintaining a position of a tethered net, or whether such flight is dynamic to deploy or otherwise move a tethered net). Such on-board aerial vehicle detection system 137 can be operated in conjunction with the external aerial vehicle detection system 100 and/or the projectile launching mechanism 200a to track a dynamic flight position of the target aerial vehicle 104a, so that if the external aerial vehicle detection system 100 and/or the projectile launching mechanism 200a is unable to do so for any reason, then the on-board aerial vehicle detection system 137 can continue to track the target aerial vehicle 104a on its own as a back-up or redundant detection system.

Concurrently (or alternatively), while the counter-attack UAV 102a is operated in flight, command data can be processed by the CPU 122 of the counter-attack UAV 102a to control a pointing position of the optical sensor(s) 119 to "tell" the counter-attack UAV 102a where to "look" in airspace to find the target aerial vehicle 104a, in one example. Specifically, one of the optical sensors 119 can be rotatably mounted to a flight body or platform of the counter-attack UAV 102a by one or more gimbal device(s) 138. The CPU 122 can then transmit control signals to gimbal controller(s) that control operation of the gimbal device(s) 138 (e.g., 3-axis gimbals) to establish and control a pointing position of the optical sensor 119 (i.e., to point the particular camera toward the detected target aerial vehicle 104a). As long as the target aerial vehicle 104a is within a detection range of the camera (e.g., up to 150 m, or more in some examples), the counter-attack UAV 102a can detect and track the position of the target aerial vehicle 104a on its own and without the assistance of the external aerial vehicle detection system 100 and/or the projectile launching mechanism 200a, if necessary. Any of the other counter-attack UAVs exemplified herein, such as counter-attack UAV 102b, can have the same or similar features and functionality as well.

In some examples, the other sensors 120 can comprise one or more radar device(s), such as compact phased array radars and automotive radars. Small phase array radar systems, such as the Echodyne Mesa-X7, Fortem Technologies TrueView R20, and automotive radar systems like the Delphi Automotive Radar, can be incorporated in the counter-attack UAV 102a, which have a range of more than 200 m for small targets, such as small consumer drones (e.g., DJI Phantom 4). A radar array could also be used as a detection sensor of the external aerial vehicle detection system 100 for detection of a target aerial vehicle.

In some examples, in cases where the external aerial vehicle detection system 100 (or the projectile launching mechanism 200a) is unable to detect the target aerial vehicle 104a (e.g., due to weather, or intermittent signal losses), the counter-attack UAV 102a may be able to utilize its components (FIG. 3) to detect and track the position of the target aerial vehicle 104a.

Figure 5:
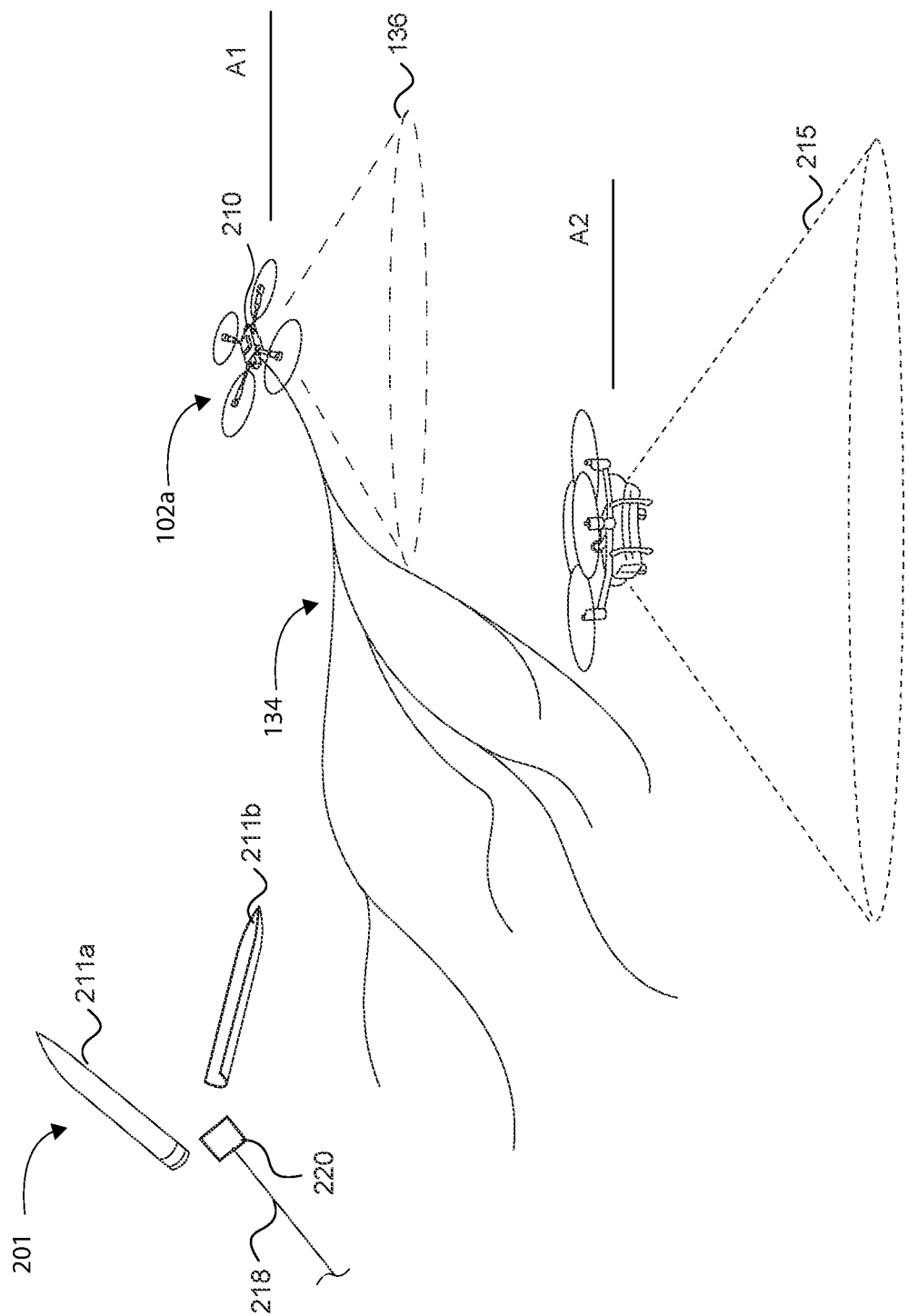
FIG. 5 illustrates a counter-attack UAV being separated from a projectile and intercepting a target aerial vehicle in accordance with an example of the present disclosure.

The various components schematically shown in FIG. 3 can be supported about a flight platform 210 of the counter-attack UAV 102a (e.g., FIG. 5). The flight platform 210 can comprise a flight body, or a portion thereof, that structurally supports the components of FIG. 3 (and that also supports a battery powering such components).

As illustrated in FIG. 1, and in one example, once the target aerial vehicle 104a is flown within a certain detectable distance of the counter attack UAV 102a (e.g., 10-150 m), such that the target aerial vehicle 104a is within a FOV 136 of the optical sensor(s) 119, the counter-attack UAV 102a may utilize its on-board optical sensor(s) 119 to continuously track the dynamic position or flight path of the target aerial vehicle 104a. For example, a particular on-board optical sensor can comprise a video camera, mounted on a gimbal device (supported and operated by the counter-attack UAV 102a), that can be operated to identify and track the target aerial vehicle 104a, similarly as discussed above regarding the detection sensors of the external aerial vehicle detection systems. For instance, a Kalman filter (or another variation of a Bayesian filter) can be executed as an algorithm by a processor of the CPU 122, and that uses digital signals generated by the video camera to estimate and predict the velocity, position, and orientation of the particular target aerial vehicle, and then executes a feedback control loop that autonomously and continuously adjust the gimbal device to keep the target aerial vehicle centered about the FOV 136 of the video camera, for instance. Such camera could be equipped with a long or medium focus telephoto lens to maximize the distance at which a target aerial vehicle may be identified and tracked. However, because the external aerial vehicle detection system 100 and/or the projectile launching mechanism 200a can transmit command data associated with a detected position of the target aerial vehicle 104a to the counter-attack UAV 102a, a narrower FOV can be acceptable in some instances, if it means the on-board camera has a longer range of detection and tracking capabilities.

In some examples, as shown in FIG. 3, the counter-attack UAV 102a can be equipped with an optical sensor or camera (e.g., 119) having a narrow band pass filter, and accompanied by an optical frequency matched illumination source (e.g., high-power LED). The LED can be directed to illuminate the target aerial vehicle 104a, while reducing background contributions, so that the camera and filter can better detect and track the target aerial vehicle 104a. Such on-board camera and narrow band pass filter can also be used to detect only that frequency of light illuminated onto a target aerial vehicle by the illumination device 116a of the external aerial vehicle detection system 100 and/or the projectile launching mechanism 200 (e.g., 200a), as initially mentioned above regarding the description of FIG. 1.

With further reference to FIG. 3, the counter-attack UAV 102a can have a GPS device 135 (e.g., a real-time kinematic (RTK) GPS) coupled to the flight controller 126 for determining and updating a position of the counter-attack UAV 102a (e.g., to other counter-attack UAVs and/or to the external aerial vehicle detection system 100 and/or the projectile launching mechanism 200s). The counter-attack UAV 102a can comprise an inter-UAV swarm communication system comprising an inter-UAV radio 141 coupled to the CPU 122 for communication between other counter-attack UAV(s), such as counter-attack UAV 102b and others, to facilitate coordinated flight configurations, in instance where a plurality of counter-attack UAVs are launched and in flight. The inter-UAV swarm communication system can further comprise an inter-UAV position sensor 139 (e.g., ultra-wideband (UWB) tag) operably coupled to the CPU 122 to assist with determining individual position of the counter-attack UAV 102a to facilitate possible coordinated flight configurations with other counter-attack UAV(s) (e.g., 102b).

As schematically shown in FIG. 3, in one example the projectile 201a can comprise a release device 127 and a radio 125 (or other wireless transmitter), which can be communicatively coupled to the radio 124 of the counter-attack UAV 102a and/or to a radio of the external aerial vehicle detection system 100 and/or of the projectile launching mechanism 200a. In this manner, the radio 125 can receive command data associated with a particular time and/or geolocation of when and where to activate/actuate the release device 127, thereby separating housings of the projectile to release or separate the counter-attack UAV 102a from the projectile 201a (as further detailed below) at a particular location and altitude.

Figure 4B:
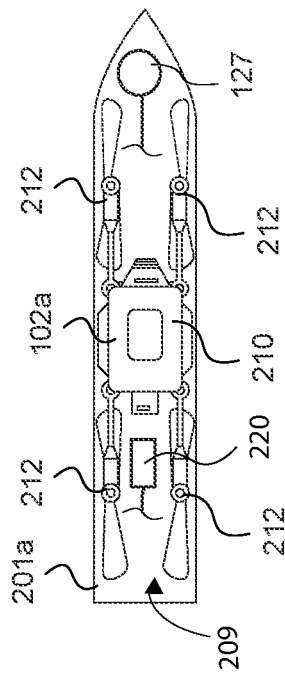
FIG. 4B illustrates the projectile of FIG. 4A supporting the counter-attack UAV in accordance with an example of the present disclosure.
Figure 4A:
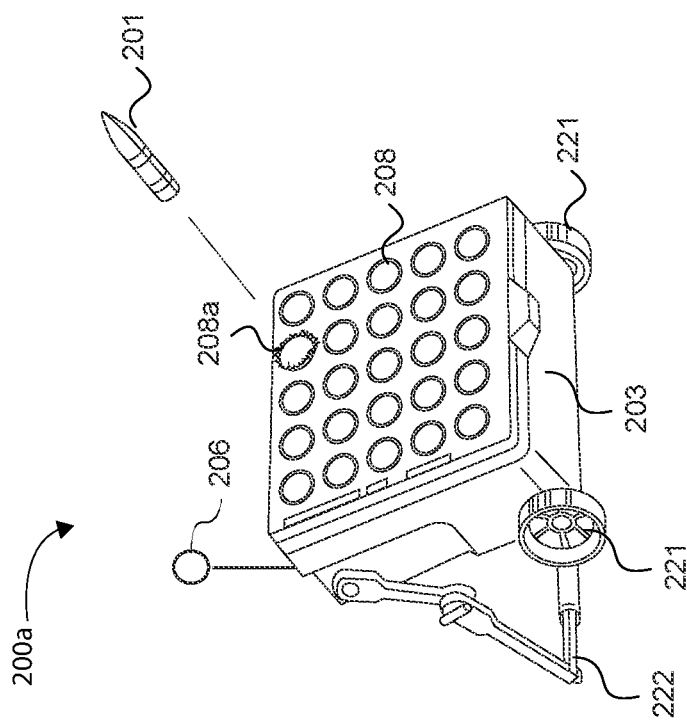
FIG. 4A illustrates a projectile launching mechanism that is launching a projectile that supports a counter-attack UAV in accordance with an example of the present disclosure.

FIGS. 4A-5 show further details of the system and method of intercepting and neutralizing one or more target aerial vehicles (such as the target aerial vehicles 104a and 104b shown in FIG. 1). The projectile launching mechanism 200a can comprise a platform 203 that supports and defines a plurality of launch chambers 208 that can each receive and support and launch a projectile, such as the projectile 201 shown launched from chamber 208. Schematically shown is one or more detection sensors 206, that can be similar to sensors 106a detailed above, and that can be supported by the platform 203 in a suitable manner (e.g., by motorized gimbals(s)). Alternatively, the detection sensor(s) 206 can be supported remotely at another location, and then command data associated with the detected target aerial vehicle 104a can be transmitted to a radio of the projectile launching mechanism 200a for processing with a CPU (whether supported locally or remotely from the projectile launching mechanism). Then, the CPU can cause or instruct the projectile launching mechanism 200a to activate a launch device (e.g., an air cannon) of the projectile launching mechanism 200a to launch the projectile 201 at a particular time, and to a particular location and altitude. The projectile launching mechanism 200a can also transmit command data to the counter-attack UAV 102a regarding the detected position of the target aerial vehicle 104a, such as detailed above.

In one example, the counter-attack UAV 102a can be configured in a folded position (FIG. 4B) within an inner chamber 209 of the projectile 201 when in the launch chamber 208a (and during aerial transport of the counter-attack UAV 102a). When released or separated from the projectile 201, the counter-attack UAV 102a can reconfigure to an unfolded configuration (FIG. 5), as detailed below. Thus, the counter-attack UAV 102a can comprise the flight platform 210 and a plurality of rotor assemblies 212 each folded inwardly relative to the flight platform 210. Each rotor assembly 212 can comprise a movable support member supported by and extending from the flight platform 210, and a propeller/rotor supported at the end of each movable support member. The movable support members can each be pivotally coupled to the flight body 203 in any suitable manner, and an elastic component (e.g., a coil spring) can outwardly bias each movable support member, so that upon being released or separated from the projectile 201a, the rotor assemblies 212 automatically spring outwardly to be ready for a flight mode. It will be appreciated by those skilled in the art that there are many different ways of folding rotor assemblies, and automatically (or controllably) unfolding rotor assemblies from a flight body, which are contemplated herein.

With more particularity, and as shown in FIG. 5, the projectile 201a can comprise a first housing section 211a and a second housing section 211b that can be removably coupled to each other, and that can define the inner chamber 209 that contains or supports the counter-attack UAV 102a. The first and second housing sections 211a and 211b can be comprised of a rigid material, such as a composite, polymer, plastic, etc., and can be removably coupled to each other by any suitable means, such as being press fit, adhered, clipped, or other such means of coupling two bodies together that are separable upon application of a force or other separating event, such as via an incendiary device.

When coupled together, the first and second housing sections 211a and 211b can house the counter attack UAV 102a and can maintain the rotor assemblies 212 in the folded configuration by virtue of the size and shape of the first and second housing sections 211a and 211b that operate to bias the rotor assemblies 212 in the folded configuration, as shown in FIG. 4B. Upon separation of the first housing section 211a from the second housing section 211b, the respective elastic components (discussed above) can cause the rotor assemblies 212 to automatically move to the unfolded position. In one aspect, a position sensor or other sensor can be supported by the counter-attack UAV 102a, and can be configured to sense or determine when one or more of the rotor assemblies 212 have been automatically unfolded. Such sensor can be electrically coupled to the CPU 112, such that upon receiving a signal from the sensor, the CPU 112 can then instruct (or control operation of) the flight controller 126 to operate, thereby placing the counter-attack UAV 102a in a flight mode (i.e., soon after being separated from the projectile 200a). In addition, the CPU 112 can be configured to similarly "turn-on" or activate other components of the counter-attack UAV 102a after the sensor transmits such signal to the CPU, such as activating a variety of on-board electrical components (e.g., sensors 119 and/or 120) for tracking a target aerial vehicle. Other methods of moving the rotor assemblies 212 to the unfolded position can be implemented, such as operating electric actuators coupled to the support members that are operable to automatically unfold the rotor assemblies 212 when released from the projectile 201a, when determined via operation of the sensor and on-board CPU.

In some examples, the projectile 201 can comprise a housing release mechanism 127 configured to at least partially (or fully) separate the first housing section 211a from the second housing section 211b. The housing release mechanism 127 can comprise any device or system capable of facilitating separation of the first and second housing sections 211a, 211b. In one non-limiting example, the housing release mechanism 127 can comprise an electric actuator operating a pair of opposing actuation members that exert opposing forces to or against respective housing sections 211a and 211b to separate the housing sections 211a and 211b. The housing release mechanism 127 could alternatively be a controlled explosive device that causes separation of the housing sections 211a and 211b with a small explosion. A controller or clock or other device may be required to achieve such method of separation. A large number of mechanisms can be used to accomplish the separation of the housing sections. In one example miniature explosive bolts (pyrotechnic fasteners) may be used to hold the housing sections together, and triggered while in flight to allow the housing sections to separate.

In another example the housing sections may be held together using simple pins and clevis. The pin may be spring loaded with the pin being kept in its energized state by a fine tread (e.g. a Dynema fiber) around which a small heating wire is wrapped. The pin may be released allowing the housing sections to separate from each other by sending a small current pulse with sufficient energy to heat up the heating wire and melt the tread used to hold the spring coupled to the pin under tension. Multiple other methods may be used to hold the housing sections together and allow them to separate on demand.

In an alternative manner of separating the housing sections 211a and 211b, the housing release mechanism 127 can comprise a tether 218 can be coupled to the platform 203 (FIG. 4A) at an inside portion of the launch chamber 208a at one end, and at the other end the tether 218 can be coupled to the projectile 201 via a coupling mechanism 220. The coupling mechanism 220 can be a body that is interfaced to portions of the housing sections 211a and 211b (or the coupling mechanism 220 can couple the housing sections together), so that upon the projectile 201 reaching a particular distance from the platform 203, the tether 218 can be fully extended, thereby causing the coupling mechanism 220 to automatically separate the housing sections 211a and 211b from each other due to the impact force or pulling force via the tether that causes the housing sections 211a and 211b to separate. This can cause separation of the counter-attack UAV 102a from the projectile 201 at a predetermined location. In one aspect, the tether 218 can be spooled around a controllable reel device associated with the platform 203. Such controllable reel device can be controlled by a CPU to stop unspooling of the tether 218 upon a predetermined distance, which can be an associated with the detected or predicted position and altitude of the target aerial vehicle 104a. Many different mechanisms may be used to accomplish this goal. In one example the housing sections may be held together by a quick release ball detent pin inserted into a socket equipped with feature configured to hold the housing sections together. The ball detent pin can be coupled to the tether that is unspooled by the reel device. When the reel is controlled to stop unspooling, the tension in the tether builds up causing the pin to pull out of its socket allowing the housing sections to separate.

In another example, the housing sections 211a and 211b can be caused to open or separate from each other by the force of airflow. For instance, the housing release mechanism 127 can comprise an airshock system comprising one or more apertures formed in the housing sections 211a and 211b. Upon an amount of air entering the one or more apertures formed through one or both of the housing sections 211a and 211b after the projectile 201 is launched, the increased air pressure can be sufficient to cause the housing sections 211a and 211b to separate from each other, thereby deploying the counter-attack UAV 102a.

In another example, a particular projectile can tow a counter-attack UAV after the projectile is launched from a platform, and then the counter-attack UAV (whether folded or unfolded) can be released from the projectile by a release device at a particular location and altitude. Thus, the projectile can act as merely a transport means towing the counter-attack UAV. In another example, one or more counter-attack UAV(s) may be in an unfolded configuration but supported inside of a projectile, such as a plurality of miniature UAVs stored and supported in an unfolded configuration within the projectile, which can be released and deployed from the projectile upon separation of the housing sections of the projectile, wherein the miniature UAVs can carry and deploy an aerial countermeasure, or wherein they can be flown in a swarm to physically engage and intercept the target aerial vehicle, thus neutralizing the target aerial vehicle.

In another example, the projectile 201 can comprise an on-board propulsion system that facilitates projection from the platform 203 (or other platform) and sustained flight for a period of time. In this example, the on-board propulsion device can include any number of propulsion systems, such as those that utilize air, water, fuel, etc. to generate propulsion.

Despite the method of releasing or separating the counter-attack UAV 102a from the projectile 201, the counter-attack UAV 102a can be released from the projectile 201 at a predetermined position or location (e.g., geolocation and altitude) relative to the target aerial vehicle that is undetectable by a sensor (with a FOV 215) of the target aerial vehicle 104a. For instance, most or all UAVs have sensors/cameras mounted below a horizontal plane of the flight body, so the cameras can only "look" forward or downwardly relative to the flight body (i.e., they cannot look up or above the flight body when flying generally horizontally). Accordingly, if the projectile launching mechanism 201a detects and tracks a particular flight path of the target aerial vehicle 104a (e.g., one having a static altitude or constant altitude gain), the projectile launching mechanism 201a can control the timing of launching the projectile 201, and can even control the velocity of the projectile 201 (e.g., by controlling an amount of compressed air that launches the projectile 201a), and therefore controlling an altitude that the projectile can reach. Once the projectile 201 is in flight, the projectile launching mechanism 201a (or an on-board release device) can control the particular point in time and altitude of releasing the counter-attack UAV 102a from the projectile 201. This can be achieved by the projectile launching mechanism 201a being in wireless communication with a controller or release device, such that a CPU or controller on the projectile launching mechanism 201a can instruct the release device when to be actuated to separate the housings from each other, and thereby deploy the counter-attack UAV 102a. This can be performed during accent or decent or at an apogee of the projectile 201 Thus, the counter-attack UAV 102a can be delivered by the projectile 201 (and released therefrom) at a predetermined aerial location or position that is a stealth location, such as altitude A1, that may be a known or predetermined aerial position, and that is greater than a known or predicted altitude A2 of the target aerial vehicle 104a. In this aspect, the target aerial vehicle 104a will be unable to detect (and therefore potentially evade) the counter-attack UAV 102a in the event that the target aerial vehicle 104a cannot sense or detect the counter-attack UAV at that particular location due to its limited sensing capabilities. Once the counter-attack UAV 102a is in flight, an on-board sensor (e.g., 119, 120, and with FOV 136), can be operable to view and track the target aerial vehicle 104a from a location above (and also likely behind) the target aerial vehicle 104a for purposes of interception and neutralization. Therefore, the counter-attack UAV 102a can initiate an attack to neutralize the target aerial vehicle 104a from a position above the target aerial vehicle 104a before its presence is detected by the target aerial vehicle 104a.

Moreover, because the counter-attack UAV 102a has been launched into airspace by the projectile launching mechanism 201a, the counter-attack UAV 102a can conserve battery power, because it does not require on-board power for transportation to the stealth location, for instance. Therefore, the counter-attack UAV 102a may be operated in flight for a longer period of time than a particular target aerial vehicle, which helps to improve the potential to intercept and neutralize the target aerial vehicle as the counter-attack UAV 102a can maintain flight at an extended duration that will likely be beyond that of the target aerial vehicle 104a, particularly if the target aerial vehicle 104a attempts to evade (or counterattack) the counter-attack UAV 102a for a period of time longer than the battery capacity of the target aerial vehicle 104a.

In the examples shown in FIGS. 1 and 5, the counter-attack UAV 102a can comprise or support the aerial vehicle countermeasure 134, such as a net or filament element(s), for neutralizing the target aerial vehicle 104a. Specifically, the projectile 201 can support the aerial vehicle countermeasure 134 inside the inner chamber 209 in a suitable manner, such as being bundled together by a device that can be deployed or removed, such as in a small housing having an opening through which the filament is drawn from when the counter-attack UAV 102a is released from the projectile 201. As such, the projectile can comprise a chamber or area for receiving and stowing the aerial vehicle countermeasure 134. In addition, a small weight, or weights, can be coupled to ends of one or more filaments to prevent the filaments from entangling in the rotors of the counter-attack UAV 102a. Alternatively, one or more support rods or members supported by the flight body can unfold upon separation from the projectile, and the support rod or member can support the filament elements of the aerial vehicle countermeasure 134.

Once the counter-attack UAV 102*a* is released and its rotor assemblies 212 are unfolded (and therefore is towing the aerial vehicle countermeasure 134 during flight), the counter-attack UAV 102*a* can then intercept and neutralize the target aerial vehicle 104*a*. More specifically, and as described above regarding FIGS. 1-3, the counter-attack UAV 102*a* can receive command data associated with a detected position of the target aerial vehicle 104*a*, so that the counter-attack UAV 102*a* can autonomously control a pointing position of one of its on-board cameras (e.g., 119) to detect and track the position of the target aerial vehicle 104*a*, as exemplified herein. Based on the tracked position, the counter-attack UAV 102*a* can autonomously intercept the target aerial vehicle 104*a* by operating a flight controller (e.g., 126) that can operate the counter-attack UAV 102*a* at full speed to do a fly-by, for instance, proximate the target aerial vehicle 104*a* at a close enough distance (e.g., a few meters) so that the filament elements of the aerial vehicle countermeasure 134 become entangled in the rotor(s) of the target aerial vehicle 104*a* to neutralize operation of the target aerial vehicle 104*a*. Thus, the counter-attack UAV 102*a* can be operated to navigate in the stealth position or flight path (as discussed above) until just before intercepting and neutralizing the target aerial vehicle 104*a* (e.g., within a few meters generally above the target aerial vehicle 104*a*).

With further reference to FIG. 4A, the platform 203 can comprise a ground-movable vehicle having at least one mobility mechanism 221 (e.g., wheel(s), track(s)) supported by the platform 203 such that the projectile launching mechanism 200*a* is portable, such as by a human operator or vehicle pushing or pulling the platform 203 along a ground surface to a desired location. A foldable stand 222 can be supported by the platform 203, and operated to be unfolded from the platform 203 for pushing/pulling the platform 203 around a ground surface, and for positioning the platform 203 at an upward angle toward monitored airspace. This can position the launch chambers 208 at a desired angle toward an airspace of interests, and therefore toward possible incoming target aerial vehicles.

In some examples, the at least one mobility mechanism 221 can be operated by an on-board electric motor that can move the platform 203 (i.e., without the assistance of a human pushing the platform 203 into a desired position). In one aspect, a CPU on-board the platform 203 (or other CPU) can process and cause transmission of signals that instruct electrically-powered wheels of the platform to autonomously (or manually) move the platform 203 to a desired position. In one example, only one wheel can be automatically operated, thereby rotating or moving the platform 203 about a ground surface, thereby changing the angle that the platform 203 faces upwardly. This can be performed in response to a position of a detected target aerial vehicle. In another example, the platform 203 can be supported about a turret that can be powered to rotate the platform 203 in any direction, or to change its launch angle relative to a ground surface.

Figure 6:
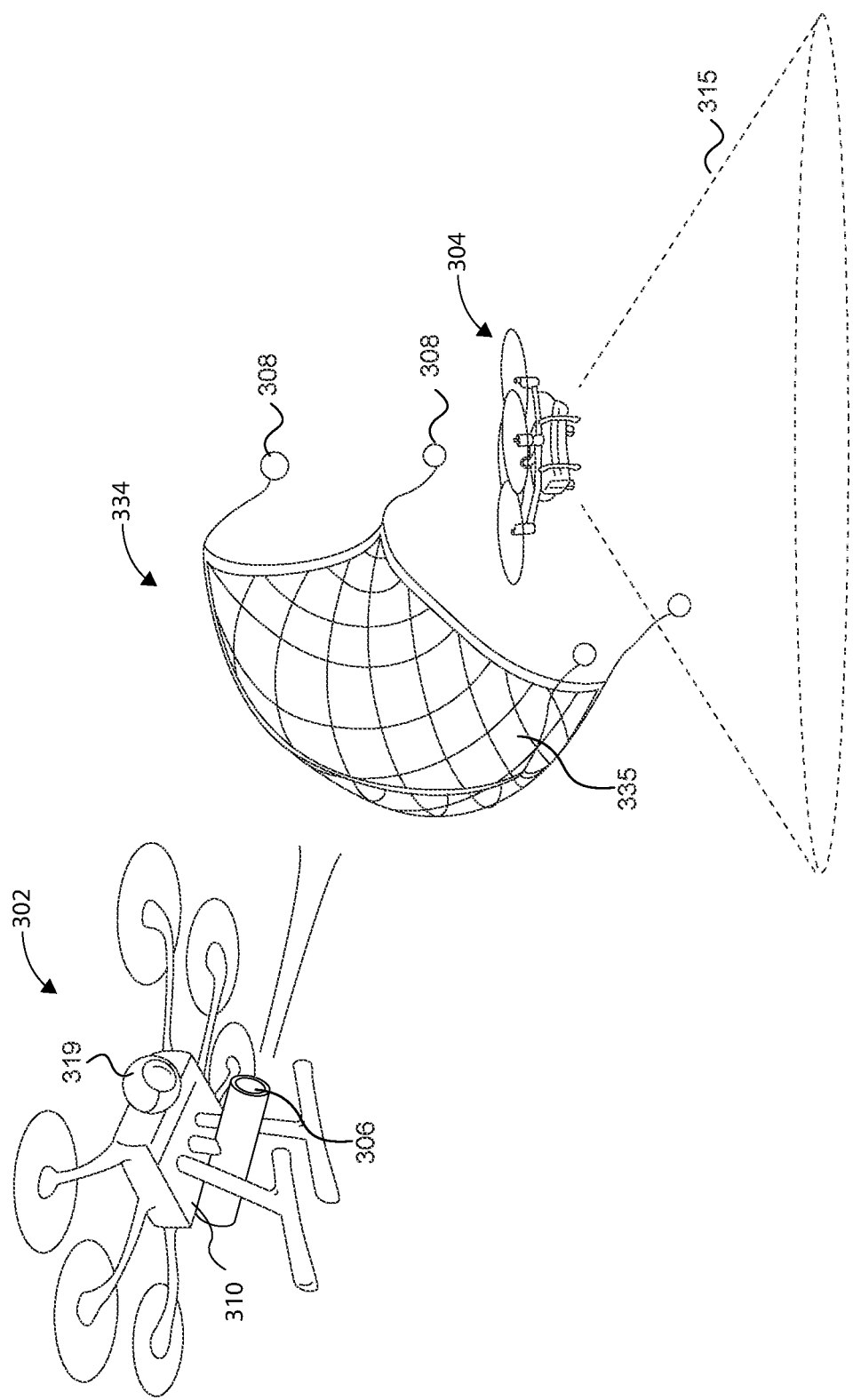
FIG. 6 illustrates a counter-attack UAV launching an aerial vehicle countermeasure to neutralize or capture a target aerial vehicle in accordance with another example of the present disclosure.

FIG. 6 illustrates another example of neutralizing a target aerial vehicle 304 with a counter-attack UAV 302. The counter-attack UAV 302 can have the same or similar features as the counter-attack UAVs described above, and can be housed in a projectile launched from the projectile launching mechanism (and then separated from the projectile, as detailed above). Notably, in this example the counter-attack UAV 302 can comprise a countermeasure launching device 306 operable to launch an aerial vehicle countermeasure 334 toward the target aerial vehicle 304 to capture or neutralize the target aerial vehicle 304. In one example, the countermeasure launching device 306 can be a single use disruptor tube that is powered (e.g., chemically, pneumatically, via combustion, and others) to shoot or launch the aerial vehicle capture countermeasure 334, such as a net 335 having one or more weights 308 that assist to propel the net 335 during flight. Those skilled in the art will recognize the different types and functions of single use disruptor tubes, and as such these will not be discussed in great detail.

The countermeasure launching device 306 can be rotatably mounted to the flight platform 310 of the counter-attack UAV 302 via a gimbal device that rotatably controls a pointing position of the countermeasure launching device 306. The gimbal device can be autonomously controlled to be pointed toward the tracked position of the target aerial vehicle 304. Movement of the gimbal device can by synced or coordinated with movement of a gimbal that supports an on-board camera 319, which may be always pointed toward the tracked target aerial vehicle 304, as detailed above regarding FIG. 3. Thus, the projectile launching mechanism 306 may also be generally pointed toward the target aerial vehicle 304 as the on-board camera 319 moves while tracking the target aerial vehicle 304. Alternatively, the countermeasure launching device 306 can operate independently of the movement of the on-board camera, such as by the motorized gimbal device that is moved to a position that anticipates the flight path of the target aerial vehicle, such as by utilizing a Kalman filter and on-board CPU that instructs the movement and operation of the countermeasure launching device 306.

Once the counter-attack UAV 302 is in close proximity to the target aerial vehicle 204 (e.g., 1-10 meters) as detected by the on-board camera 319 (or other external sensor), the CPU of the counter-attack UAV 302 can transmit a command signal to a launch controller of the countermeasure launching device 306 that causes launching of the aerial vehicle countermeasure 334. As exemplified regarding FIG. 5, the counter-attack UAV 302 can be released and operated in a flight path slightly above (in altitude) the target aerial vehicle 304 before launching the aerial vehicle countermeasure 334, which can be a surprise-attack from above a FOV 315 of a sensor of the target aerial vehicle 304. This can also take advantage of gravitational forces acting on the aerial vehicle countermeasure 334, which may extend the flight time and range of the aerial vehicle countermeasure 334, thereby increasing the likelihood of capturing and neutralizing the target aerial vehicle 304.

In another example, a number of pellets or slugs (plastic, metallic, etc.) can be launched or shot from the projectile launching mechanism 306. Other aerial vehicle capture countermeasures that can be shot from the projectile launching mechanism 306 can comprise combustible fluids, adhesives or expanding foams, or even a target tagging agent (e.g., UV florescent paint) for purposes of tracking the target aerial vehicle 304 with a UV sensor. Such impact devices could be housed in a spherical breakable projectile housing, much like a paintball housing that breaks upon impacting an object. In other examples, a plurality of countermeasure launching devices can be supported and operated by a particular counter-attack UAV. In another example, a parachute can be coupled to the aerial vehicle countermeasure 334, so that once the target aerial vehicle is captured, the parachute can effectuate slower/safe entry to the ground to prevent personal injury or damage to structures.

Figure 7:
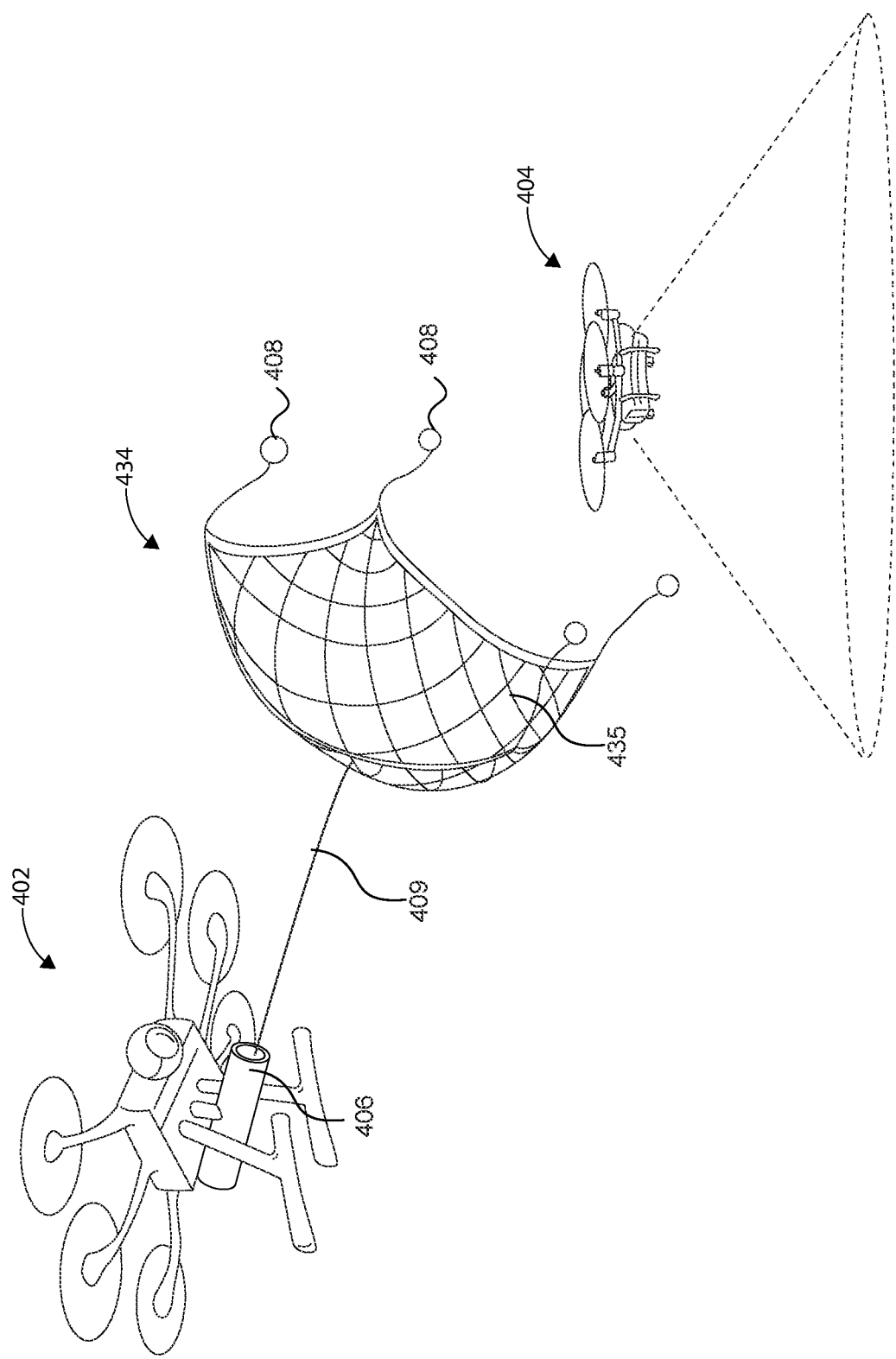
FIG. 7 illustrates a counter-attack UAV launching an aerial vehicle countermeasure to neutralize or capture a target aerial vehicle in accordance with another example of the present disclosure.

FIG. 7 shows an alternative system to FIG. 6, where an aerial vehicle countermeasure 434 (a net), launched from a countermeasure launching device 406, is tethered to a counter-attack UAV 402 by a flexible line 409. Accordingly, once the target aerial vehicle 404 is captured, the counter-attack UAV 402 can carry and transport the target aerial vehicle 404 to a particular location for safe disposal (i.e., away from people and structures to prevent damage that may result from a target aerial vehicle from falling out of the sky at a random or uncontrolled location). The tether 409 can be bundled or spooled inside of the countermeasure launching device 406, and tethered to the countermeasure launching device 406 or the flight body of the counter-attack UAV 402. The tether can be relatively short (e.g., 1 meter) or relatively long (e.g., 10 meters or more).

In one aspect, the counter-attack UAV 402 can have a release device coupling the flexible line 409 to the counter-attack UAV 402. The release device can be communicatively coupled to the on-board CPU (wired or wirelessly), so that the CPU can operate to instruct actuation of the release device to release the countermeasure launching device 406 and the captured target aerial vehicle 404 to a particular location (and then the counter-attack UAV 402 can fly away). The CPU can effectuate this autonomously by controlling flight of the counter-attack UAV 402 to a safe or predetermined location, and then by controlling the release device to release the net and captured target aerial vehicle. The release device can be any suitable release mechanism operable to release two lines or bodies from each other upon actuation or operation of the release device.

Figure 8:
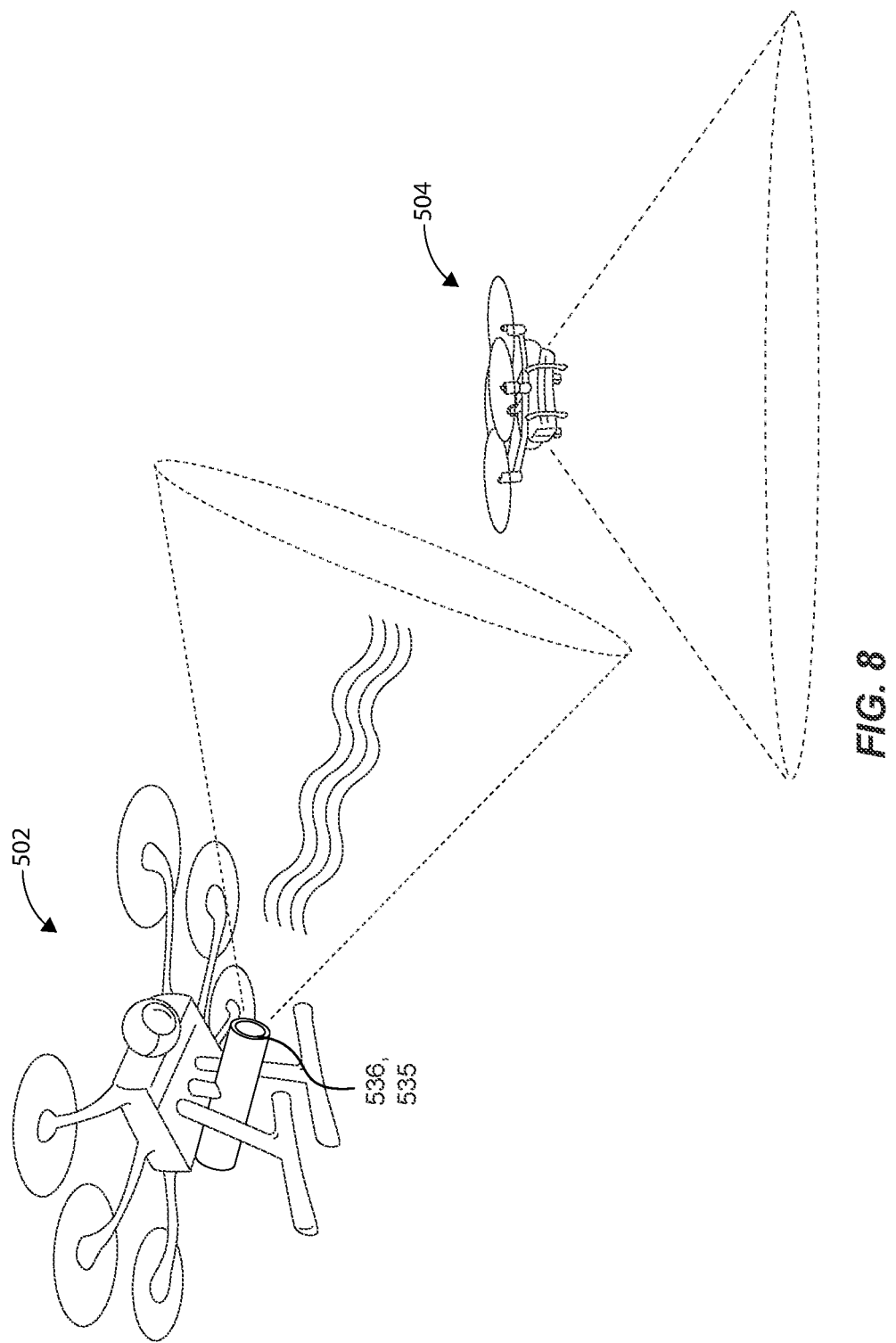
FIG. 8 illustrates a counter-attack UAV operating an aerial vehicle countermeasure to neutralize a target aerial vehicle in accordance with another example of the present disclosure.

FIG. 8 illustrates another example of neutralizing a target aerial vehicle 504 with a counter-attack UAV 502. The counter-attack UAV 502 can have the same or similar features as the counter-attack UAVs described above, and can be housed in a projectile launched from a projectile launching mechanism (and then released from the projectile, as detailed above). Notably, in this example the counter-attack UAV 502 can comprise an aerial vehicle capture countermeasure 535 in the form of a direct energy device 536 operable to disrupt operation of at least one component or system of the target aerial vehicle 504. In one example, the direct energy device 536 can comprise a light emitter operable to emit light at a predetermined frequency that disrupts operation of at least one sensor of the target aerial vehicle 504, thereby neutralizing the target aerial vehicle 504. More specifically, the direct energy device 536 can be an ultra-bright light emitter, which emits light at frequencies that cameras are sensitive to (such as a 4K camera on the target aerial vehicle 504), including across the full or partial spectrum of the capability of such camera. The direct energy 536 could be coupled to a controller and CPU of the counter-attack UAV 502, and the CPU can be programmed to cause flashes at intervals and for durations that most effectively put such cameras into a perpetual state of dynamic light exposure adjustment. This makes them ineffective for either vision, or being used to provide visual inertial odometry, collision avoidance, or object recognition. This is another example of "neutralizing" a target aerial vehicle by disrupting operations of one or more systems or components of the target aerial vehicle. As described regarding FIG. 6, the aerial vehicle capture countermeasure 536 can be rotatably coupled to the counter-attack UAV 502 via a gimbal device, which may or may not move in-sync with a gimbal device supporting an on-board camera.

In another example, the direct energy device 536 can comprise at least one of an air vortex cannon, an acoustic wave device, a microwave device, or a laser. Using an air vortex cannon, small doughnut-shaped air vortices can be projected towards the target aerial vehicle for disrupting its flight, which may cause its rotors to automatically stop working while the target aerial vehicle falls to the ground. Using an acoustic wave device, it can be used to excite resonance in a gyroscope of the target aerial vehicle, which can make it lose control and fall to the ground. Using a microwave device, high-powered microwave weapons can be mounted to the counter-attack UAV and directed toward the target aerial vehicle to interrupt the electronics and/or guidance system on the target aerial vehicle, which can cause it to fall to the ground. Using a laser, a high-powered laser could be mounted to the counter-attack UAV and directed to the target aerial vehicle to damage or disrupt operation of the target aerial vehicle, which can cause it to fall to the ground Concurrently, or alternatively, such direct energy devices can be part of the external aerial vehicle detection system 100 (i.e., on a ground-based structure, a vessel, etc.), and/or part of the projectile launching mechanism 200a, and can be used in conjunction with the various vehicle detection sensors and systems described herein for detecting, tracking, and neutralizing target aerial vehicles.

Figure 9:
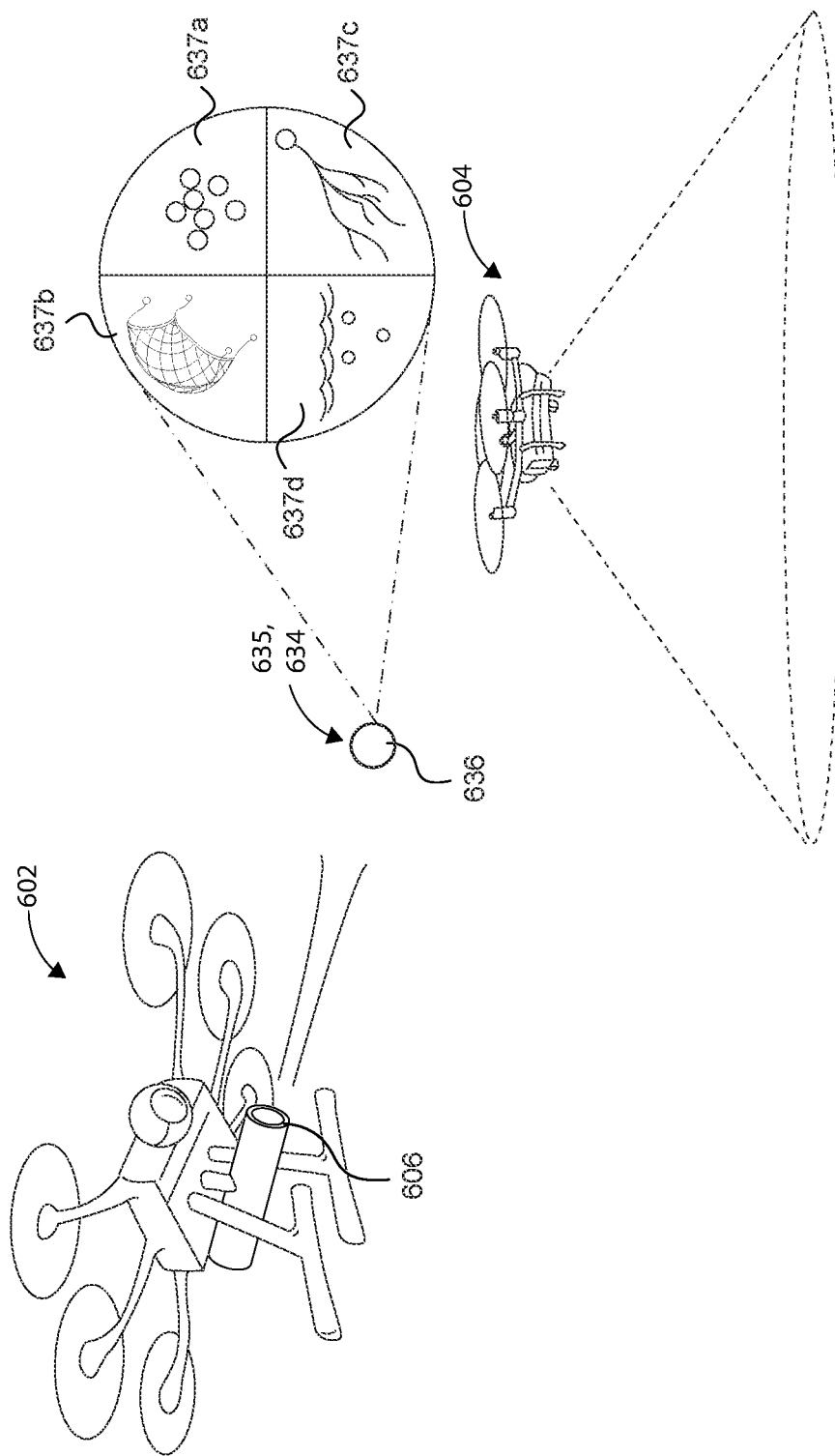
FIG. 9 illustrates a counter-attack UAV launching an aerial vehicle countermeasure to neutralize a target aerial vehicle in accordance with another example of the present disclosure.

FIG. 9 illustrates another example of neutralizing the target aerial vehicle 604 with a counter-attack UAV 602. The counter-attack UAV 602 can have the same or similar features as the counter-attack UAVs described above, and can be housed in a projectile launched from the projectile launching mechanism (and then released from the projectile, as detailed above). Notably, in this example the counter-attack UAV 602 can comprise a countermeasure launching device 606 operable to launch an aerial vehicle capture countermeasure 634 toward the target aerial vehicle 604 to neutralize the target aerial vehicle 604. Specifically, the countermeasure launching device 606 can be the same or similar to the launching device 26 described with reference to U.S. Pat. No. 8,783,185 B2, which is incorporated herein by reference in its entirety.

The countermeasure launching device 606 can be rotatably mounted to the flight body of the counter-attack UAV 602 via a gimbal device, and can be operated in the same manner such as described regarding the example countermeasure launching device of FIG. 6.

The countermeasure launching device 606 can be a water cannon or a high pressure pneumatic cannon, or a cannon using chemical propellants (explosives, combustible mixtures such as propane-air and others). Thus, the countermeasure launching device 606 can be operable to launch the aerial vehicle capture countermeasure 634 in the form of a non-Newtonian liquid projectile 635 having a liquid charge. The liquid projectile 635 can comprise a non-rigid encapsulation 636 (e.g., polymer) supporting a non-rigid flight integrity component comprising an additive combined with the liquid charge to inhibit substantial break-up of the liquid charge during flight. Thus, the liquid projectile 635 is configured to fluidly disperse in response to a predetermined event (e.g., impact of with the target aerial vehicle 604). The liquid projectile 635 can include a liquid charge of a specified volume. For example, a liquid projectile may comprise liquid volumes ranging from 1 mL to 5 L. However, this range is not to be considered limiting as liquid projectile can comprise any volume capable of being contained and launched from the counter-attack UAV 602. Water cannons are known in the art and will not be discussed in great detail, but it will be appreciated that various types of water cannons can be used, or modified for use as directed herein.

The non-rigid flight integrity component 638 can modify the liquid charge and inhibit substantial break-up of the liquid charge in-flight. The flight integrity component can be an additive, a non-rigid encapsulation, a temperature modification component, or other component. Combining the flight integrity component with a liquid charge can allow the liquid charge to be launched at higher speeds and further distances than a non-modified liquid charge.

Pure water has viscous properties which allow it to reasonably maintain its form when traveling at relatively low speeds or in small quantities, such as a falling raindrop. But, when water is projected at high speeds and in large quantities, such as water projected from a fire hose, the cohesive structure of the water stream can be disrupted by air resistance, causing the resulting water stream to at least partially fracture or break apart into a spray after a certain distance. In order to launch water or other liquid charges at high speeds and far distances a flight integrity component can be combined with the water or other liquid charge to provide enhanced structure, viscosity, and/or cohesiveness. Typical liquids include: water, salt water, liquid fuel, such as flammable fuel, and other liquids.

Liquid modifying additives may also be combined with the liquid charge to inhibit substantial break-up of the liquid during flight. According to one aspect of the invention, a small quantity of polyethylene oxide (PEO), as small as 0.8% (w), can be added to a liquid, such as water, to increase the cohesive properties of the liquid. The resulting liquid projectile will also have less friction and drag than the liquid alone, thus further reducing spray. When the resulting liquid projectile is launched, the friction from a launching device is reduced and the launched stream or missile can have greater cohesiveness, resulting in higher projection speeds, further trajectories, improved accuracy, and more effective impact with a target aerial vehicle.

Similarly, polyacrylamide, polypropylene oxide, polydiamine, and other practical additives known in the art can also be combined with a liquid to inhibit substantial break-up of the liquid during flight. These and other additives can have other properties, aside from inhibiting break-up of a liquid charge during flight, which can be beneficial to liquid projectile applications. These properties may include, being slippery, being adhesive, having an odor, having a discoloration that permanently or temporarily marks a target for instant identification, or having a variety of other useful properties.

Additives can also be combined with a liquid to form shear-thickening fluids, also known as dilatant fluids, in order to inhibit substantial break-up of the liquid during flight. Shear-thickening fluids cause an increase in viscosity of the liquid charge with increasing shear stress which is most easily accomplished by increasing the rate of shear deformation. For example, a shear thickening fluid may offer little resistance to a gentle probe with one's finger, but can become increasingly viscous when one quickly thrusts a finger at the fluid. In this manner, a shear thickened liquid projectile can respond to a launching force with increased resistance, enabling the liquid projectile to be launched with more force. Upon impact this liquid projectile can increase its resistance to the stress of the impact, thus acting more like a solid projectile and inflicting greater damage to the target.

Typical shear thickening additives can include: polyethylene glycol with nano-particles of silica, corn starch or modified corn starch, potato starch, pectin, xanthan gum, arrow root powder, dihydroxypropyl ethers of cellulose, cellulose-free xanthan gum with a number of cellulose compounds, including carboxymethyl cellulose, hydroxyethyl cellulose and hydroxypropylmethyl cellulose. Other examples include, sulfonated guar and a compound comprising at least one member selected from the group consisting of xanthan gum, guar, hydroxypropyl guar or derivatives, hydroxyethyl cellulose or derivatives. Further shear thickening additives may include, cationic guar and a compound comprising at least one member selected from the group of hydroxypropyl guar or derivatives and hydroxyethyl cellulose or derivatives, hydroxypropyl cellulose with polymaleic and hydroxy derivatives, or any combination as will be practical to the invention.

Additives may be combined with a liquid charge by mixing, stirring, heating/cooling processes, injecting, reacting or applying, as well as combinations of these processes. Other combining methods are similarly contemplated in accordance with the invention.

The non-rigid encapsulation 636 can comprise a disruption apparatus or controlled disruption mechanism (shown generally as disruption apparatus) that is configured or adapted to disrupt the flight integrity component in the form of a non-rigid encapsulation and to facilitate the dispersion of or diffuse the liquid charge. The disruption apparatus can function to breach or break up or break open the flight integrity component or encapsulation of the liquid projectile, or otherwise facilitate the dispersion of the liquid charge. The disruption apparatus may be used to control the timing of the dispersion of the liquid charge (e.g., delayed or upon impact or during flight), the direction of the dispersion of the liquid charge (e.g., forward dispersion), etc. Essentially, the disruption apparatus helps to prevent the unwanted situation where the liquid projectile remains intact (the liquid charge is not dispersed) after being launched, and therefore ineffective for its intended purpose.

The disruption apparatus may comprise any system or device capable of breaching or otherwise breaking open the flight integrity component of the liquid projectile after being launched (i.e., the disruption apparatus can rip, tear, disassemble, explode or otherwise breach the encapsulation). The disruption apparatus may be configured to operate with the encapsulation or the closing device, or both. The disruption apparatus may be configured to be activated during flight of the liquid projectile (e.g., an airborne dispersant), or it may be activated upon or at some point after impact. The disruption apparatus may comprise mechanical, electrical, electromechanical systems. For example, the disruption apparatus can comprise an explosive device or charge supported somewhere on the liquid projectile. In another example, the disruption apparatus may comprise a mechanical device that impales or otherwise breaches a portion of the liquid projectile. One skilled in the art will recognize other objects or devices or systems capable of performing the function of breaching the liquid projectile.

The disruption apparatus may be triggered or activated in a number of ways, and from a variety of sources, such as radio frequencies, heat sensors, timing mechanisms, laser devices, and other suitable means. For example, the disruption apparatus may be operable with a trigger of some sort. The trigger may comprise a real-time operator-initiated trigger, wherein the operator selectively triggers or activates a delayed disruption of the non-rigid encapsulation and the diffusing of the liquid charge at a time judged to be most appropriate or effective. Alternatively, the trigger may comprise a programmed trigger, such as a preprogrammed trigger that reflects actual conditions or variables to be encountered. In still another embodiment, the liquid projectile may support a spool of wire (e.g., for receiving electrical signals that activate an associated disruption apparatus) or string (for activating a mechanical disruption apparatus) that is spooled in response to launch of the liquid projectile.

Rheologically modified fluids can also be combined with the non-rigid flight integrity component (e.g., additive, non-rigid encapsulation component) to allow for solid substances to be entrained in the liquid charge. For example, 0.10% (w) Carbopol® 674 (a product of Noveon) can be combined with a liquid charge to entrain or suspend sand particles within the liquid charge. In this manner, a variety of solids can be entrained in a liquid charge and launched. These solids can be capsules of paint, sand, pellets, explosive charges, and other solids that will be practical to the invention. In one aspect, the rheologically modified fluids can function as a flight integrity component to increase the cohesive properties of the liquid projectile in-flight. In another aspect, the rheologically modified fluids can provide additional mass to increase the impact force applied to the target, as well as a delivery system that transports the solids to the target.

Thus, the countermeasure launching device 606 can have the same or similar features of the launching device 26, as detailed further in incorporated U.S. Pat. No. 8,783,185 B2, for filling and launching the liquid projectile 635. A sighting structure can be coupled to the countermeasure launching device 606 for identifying and targeting the target aerial vehicle 604, for instance. The sighting structure can include a laser sight, an infrared targeting system, optic sights, dot sights, ring sights, peep sights, a scope, and the like. Alternatively, a sighting structure can include a camera (e.g., 4K mounted on a gimbal, as discussed above).

Therefore, the aforementioned "predetermined event" can comprises the liquid projectile 635 actually impacting the target aerial vehicle 604, such that the dispersed liquid charge interrupts operation of at least one electronic device (e.g., motors, sensors, CPU, controller, etc.) of the target aerial vehicle 604, or that damages the target aerial vehicle so that it can no longer fly. In other examples, the controlled disruption mechanism can be configured to fluidly disperse the liquid projectile 635 in response to another predetermined event. For instance, the predetermined event can comprise at least one of a predetermined distance from the counter-attack UAV 602, a predetermined time from launch from the counter-attack UAV 602, and/or a detected distance from the target aerial vehicle 604. In this manner, the CPU of the counter-attack UAV 602 can be programmed to determine the distance and/or time associated with the launch of the liquid projectile 635, and then cause breaking of the encapsulation 636 via a trigger (e.g., radio frequencies, heat sensors, timing mechanisms, laser devices, etc.), as discussed above. Therefore, when the liquid projectile 635 is in-flight proximate the target aerial vehicle 604, the controlled disruption mechanism can be activated to break open the liquid projectile 635, thereby exposing contents therein (which would still be traveling at some velocity relative to the velocity of the liquid projectile 635 before breaking open).

In some examples, the liquid projectile 635 can comprise at least one direct-impact device configured to impact and neutralize the target aerial vehicle 604, such as pellets 637a (e.g., plastic, polymer and/or metallic, composite), a filament element 637b (monofilament gill net), filaments 637c (monofilaments), and/or a liquid 637d (or even foam, adhesive, etc.). In one example, the liquid projectile 635 can comprise a tagging agent to tag the target aerial vehicle 604 for tracking flight path with a sensor (e.g., 106a or 206a), or other tracking system.

In a specific example, the counter-attack UAV 602 can be operated autonomously to intercept the target aerial vehicle 604 (as detailed above). Once the counter-attack UAV 602 is within 3 meters of the target aerial vehicle 604 (e.g., trailing directly behind at 10 m/s), the counter-attack UAV 602 can autonomously launch the liquid projectile 635 toward the target aerial vehicle 604 at a known trajectory and velocity (e.g., 25 m/s), and then when the liquid projectile 635 is approximately 1 meter away from impacting the target aerial vehicle 604, the controlled disruption mechanism can be activated to break open the liquid projectile 635. The net 637b, having one or more weights, for instance, can then break free from the liquid projectile 635 and generally continue the trajectory and initial velocity of the liquid projectile 635 (before break up), then the net 637b can impact and entangle with rotors of the target aerial vehicle 604, thereby disrupting its operation to capture and neutralize it.

FIG. 10 illustrates a system and method of neutralizing the target aerial vehicle 704 in accordance with one example of the present disclosure. In this example, a projectile launching mechanism 701 can support a plurality of launch chambers 708 that can each support and facilitate launch of a projectile, such as a liquid projectile 734 shown launched from chamber 708a. The projectile launching mechanism 701 can have the same or similar features as projectile launching mechanism 201a described above, such as having a vehicle detection system for detecting target aerial vehicles.

Once detected, the projectile launching mechanism 701 is operable to launch the liquid projectile 734 from the platform toward the target aerial vehicle 704. The liquid projectile 734 can have the same or similar features at the liquid projectile 734 described regarding the liquid projectile 635 described regarding FIG. 9. Similarly, once the liquid projectile 734 is proximate the target aerial vehicle 704, the projectile launching mechanism 701 (or other system) can transmit a signal to a controlled disruption mechanism of the liquid projectile 734 to cause it to break open, thereby releasing any number of components (e.g., a net, pellets, filaments, liquid, and others as will be apparent to those skilled in the art) to impact the target aerial vehicle 704, such as described regarding FIG. 9.

In one aspect, the projectile launching mechanism 701 (or 201a) can be operable to launch a combination of liquid projectiles and projectiles (containing counter-attack UAVs) from the same platform, but from different launch chambers.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for neutralizing a target aerial vehicle, comprising:
   a projectile launching mechanism;
   a projectile launchable by the projectile launching mechanism; and
   an aerial vehicle detection system comprising at least one detection sensor operable to detect a target aerial vehicle while in flight, and operable, in response to the detection, to provide command data to at least one of the launching mechanism or a counter-attack unmanned aerial vehicle (UAV) to facilitate neutralization of the target aerial vehicle, the counter-attack UAV supported by and separable from the projectile, and comprising an aerial vehicle countermeasure,
   wherein the projectile is formed from at least a first housing section and a second housing section releasably coupled to each other and defining an inner chamber that contains the counter-attack UAV,
   wherein, based on the command data, the projectile launching mechanism is operable to launch the projectile,
   wherein the first housing section and the second housing section are separable from one another to release the counter-attack UAV from the inner chamber at a particular geolocation relative to the target aerial vehicle in response to the command data, and
   wherein upon release of the counter-attack UAV from the projectile, the counter-attack UAV is operable to neutralize the target aerial vehicle with the aerial vehicle countermeasure.

2. The system of claim 1, wherein the counter-attack UAV is configured in a folded position within the projectile for aerial transport of the counter-attack UAV to a pre-determined location, and wherein the counter-attack UAV is operable to move to an unfolded position upon separation from the projectile.

3. The system of claim 1, wherein the particular geolocation at which the counter-attack UAV is released from the projectile comprises an aerial position relative to the target aerial vehicle, such that the counter-attack UAV is undetectable by a sensor of the target aerial vehicle.

4. The system of claim 1, wherein the command data comprises at least one of intercept data, aerial vehicle capture countermeasure deployment command data, target aerial vehicle detection data, counter-attack UAV control data, or a combination thereof.

5. The system of claim 1, wherein the aerial vehicle detection system comprises an on-board aerial vehicle detection system comprising the at least one detection sensor supported by the counter-attack UAV, and wherein the at least one detection sensor is configured to detect a position of the target aerial vehicle, and wherein a flight control system of the counter-attack UAV is operable to control autonomous flight of the counter-attack UAV based on the detected position of the target aerial vehicle.

6. The system of claim 1, wherein the aerial vehicle detection system comprises an on-platform aerial vehicle detection system comprising the at least one detection sensor supported by the projectile launching mechanism, and wherein the at least one detection sensor is operable to detect the target aerial vehicle, and wherein the on-platform aerial vehicle detection system is configured to provide command data to the counter-attack UAV to facilitate interception and neutralization of the target aerial vehicle.

7. The system of claim 1, wherein the aerial vehicle detection system comprises a ground-based aerial vehicle detection system associated with a ground-based structure, the ground-based external aerial vehicle detection system comprising the at least one detection sensor operable to detect the target aerial vehicle, and wherein the ground-based external vehicle detection system is operable to provide command data to at least one of the projectile launching mechanism or the counter-attack UAV to facilitate interception and neutralization of the target aerial vehicle.

8. The system of claim 1, wherein the counter-attack UAV comprises a flight body and plurality of rotor assemblies each folded about the flight body, wherein the plurality of rotor assemblies are configured to unfold from the flight body upon the counter-attack UAV separating from the projectile.

9. The system of claim 1, wherein the inner chamber contains the counter-attack UAV in a folded position.

10. The system of claim 9, wherein the projectile further comprises a housing release mechanism configured to at least partially separate the first housing section from the second housing section to expose the inner chamber, thereby facilitating separation and release of the counter-attack UAV from the projectile.

11. The system of claim 10, wherein the housing release mechanism comprises a tether extending between the projectile and the projectile launching mechanism, wherein after launching the projectile, the tether facilitates separation of the first housing section from the second housing section to facilitate separation and release of the counter-attack UAV from the projectile.

12. The system of claim 1, wherein the aerial vehicle countermeasure is configured to disrupt operation of the target aerial vehicle, and comprises at least one of a flexible entangling element, a net, a fluid, pellets, an electrical discharge device, or an illumination device.

13. The system of claim 1, wherein the counter-attack UAV further comprises a countermeasure launching device operable to launch the aerial vehicle countermeasure toward the target aerial vehicle to impact and neutralize the target aerial vehicle.

14. The system of claim 13, wherein the aerial vehicle countermeasure comprises a net launchable by the countermeasure launching device to capture and neutralize the target aerial vehicle.

15. The system of claim 1, wherein the projectile launching mechanism is configured to launch a plurality of projectiles, each projectile supporting a counter-attack UAV configured in a folded position.

16. The system of claim 1, wherein the target aerial vehicle comprises a sensor defining a field of view, and wherein the projectile is configured to release the counter-attack UAV from a stealth position that is not within the field of view of the target aerial vehicle.

17. A system for detecting and neutralizing a target aerial vehicle, comprising:
- a projectile launching mechanism;
- a projectile launchable from the projectile launching mechanism to a pre-determined location, wherein the projectile is formed from at least a first housing section and a second housing section releasably coupled to each other and defining an inner chamber operable to support a counter-attack unmanned aerial vehicle (UAV); and
  - separable from the projectile, and comprising an aerial vehicle countermeasure;
- an aerial vehicle detection system comprising at least one detection sensor operable to detect a target aerial vehicle while in flight, and, upon the detection, operable to provide command data to at least one of the launching mechanism or the counter-attack UAV to facilitate neutralization of the target aerial vehicle,
- wherein, based on the command data, the projectile launching mechanism is operable to launch the projectile to the pre-determined location,
- wherein the first housing section and the second housing section separate from one another to release the counter-attack UAV from the inner chamber at a particular geolocation relative to the target aerial vehicle in response to the command data, and
- wherein upon release of the counter-attack UAV from the projectile, the counter-attack UAV is operable to neutralize the target aerial vehicle via the aerial vehicle countermeasure.

18. The system of claim 17, wherein the counter-attack UAV is configured in a folded position within the projectile during aerial transport of the counter-attack UAV, and wherein the counter-attack UAV is operable to move to an unfolded position upon separation from the projectile.

19. The system of claim 17, wherein the projectile comprises a housing release mechanism operable to separate the first and second housing sections from one another, thereby releasing the counter-attack UAV at the particular geolocation relative to the target aerial vehicle.

20. The system of claim 17, wherein the particular geolocation relative to the target aerial vehicle comprises an aerial position not within a field of view of a sensor of the target aerial vehicle.

21. The system of claim 17, wherein the command data comprises at least one of intercept data, aerial vehicle capture countermeasure deployment command data, target aerial vehicle detection data, counter-attack UAV control data, or a combination thereof.

22. The system of claim 17, wherein the aerial vehicle detection system comprises an on-board aerial vehicle detection system comprising the at least one detection sensor supported by the counter-attack UAV, wherein a flight control system of the counter-attack UAV is operable to control autonomous flight of the counter-attack UAV based on the detected position of the target aerial vehicle.

23. The system of claim 17, wherein the aerial vehicle detection system comprises an on-platform aerial vehicle detection system comprising at least one detection sensor supported by the projectile launching mechanism and operable to detect the target aerial vehicle.

24. The system of claim 17, wherein the aerial vehicle detection system comprises a ground-based external aerial vehicle detection system associated with a ground-based structure, the ground-based external aerial vehicle detection system comprising the at least one detection sensor, and operable to provide command data to at least one of the projectile launching mechanism or the counter-attack UAV to facilitate interception and neutralization of the target aerial vehicle.

25. The system of claim 17, wherein the counter-attack UAV comprises a flight body and a plurality of rotor assemblies each folded about the flight body, wherein the plurality of rotor assemblies are configured to unfold from the flight body upon the counter-attack UAV separating from the projectile.

26. The system of claim 17, wherein the platform comprises a movable vehicle having at least one mobility mechanism such that the movable vehicle is portable about a ground surface.

27. The system of claim 17, wherein the counter-attack UAV comprises a countermeasure launching device, wherein the counter-attack UAV is configured to operate the countermeasure launching device to launch the aerial vehicle countermeasure toward the target aerial vehicle to impact and neutralize the target aerial vehicle.

28. The system of claim 27, wherein the aerial vehicle countermeasure comprises a projectile comprising a liquid projectile comprising a liquid charge, and comprising a non-rigid flight integrity component comprising an additive combined with the liquid charge to inhibit substantial break-up of the liquid charge during flight, the liquid projectile configured to fluidly disperse upon a predetermined event.

29. The system of claim 28, wherein the predetermined event comprises the liquid projectile impacting the target aerial vehicle, wherein the dispersed liquid charge is configured to interrupt operation of at least one critical operational device of the target aerial vehicle.

30. The system of claim 28, wherein the liquid projectile further comprises at least one direct-impact device configured to impact and neutralize the target aerial vehicle, wherein the at least one direct-impact device comprises plastic or polymer pellets, metallic pellets, composite pellets, a filament element, or a tagging agent.

31. A method for neutralizing a target aerial vehicle, comprising:
- detecting a target aerial vehicle while in flight and generating command data based on the detection of the target aerial vehicle;
- launching a projectile from a projectile launching mechanism in response to the generated command data, the projectile supporting a counter-attack unmanned aerial vehicle (UAV), wherein the projectile is formed from at least a first housing section and a second housing section releasably coupled to each other and defining an inner chamber that contains the counter-attack UAV;
- separating the first housing section from the second housing section to release the counter-attack UAV from the inner chamber of the projectile at a particular geolocation relative to the target aerial vehicle based on the generated command data; and
- operating the counter-attack UAV to neutralize the target aerial vehicle.

32. The method of claim 31, further comprising unfolding rotor assemblies of the counter-attack UAV upon separation from the projectile.

33. The method of claim 31, wherein separating the counter-attack UAV from the projectile further comprises operating a housing release mechanism to release the counter-attack UAV at a pre-determined location relative to a detected position of the target aerial vehicle.

34. The method of claim 31, further comprising transmitting the command data from an aerial vehicle detection system to the counter-attack UAV.

35. The method of claim 31, wherein detecting the target aerial vehicle comprises operating at least one detection sensor of the counter-attack UAV after separation from the projectile.

36. The method of claim 31, wherein operating the counter-attack UAV to neutralize the target aerial vehicle comprises launching an aerial vehicle countermeasure from the counter-attack UAV toward the target aerial vehicle to neutralize the target aerial vehicle.

37. The method of claim 31, wherein detecting the target aerial vehicle comprises autonomously tracking a dynamic position of the target aerial vehicle.

38. The method of claim 31, further comprising moving the projectile launching mechanism along a ground surface to a ground-based location via a mobility mechanism of the projectile launching mechanism.

39. The method of claim 31, wherein detecting the aerial vehicle further comprises at least one of determining a known altitude or predicting a predicted altitude of the target aerial vehicle, and wherein separating the first housing section from the second housing section at the particular geolocation further comprises separating the first housing section from the second housing section to release the counter-attack UAV from the inner chamber of the projectile at an altitude that is greater than the known altitude or the predicted altitude of the target aerial vehicle based on the command data, whereby the counter-attack UAV is undetectable by a sensor of the target aerial vehicle.

40. The method of claim 31 wherein operating the counter-attack UAV to neutralize the target aerial vehicle comprises operating an aerial vehicle countermeasure configured to disrupt operation of the target aerial vehicle, the aerial vehicle countermeasure comprising at least one of a flexible entangling element, a net, a fluid, pellets, an electrical discharge device, or an illumination device.

41. The system of claim 1, wherein the aerial vehicle detection system is operable to track a flight path of the target aerial vehicle, and wherein, based on the command data, the projectile launching mechanism is operable to control at least one of the timing of the launch of the projectile or the velocity of the projectile based on the tracked flight path.

42. They system of claim 3, wherein the particular geolocation at which the counter-attack UAV is released from the projectile comprises an altitude that is greater than a known or predicted altitude of the target aerial vehicle.

43. A system for neutralizing a target aerial vehicle, comprising:
a projectile formed from at least a first housing section and a second housing section releasably coupled to each other and defining an inner chamber operable to support a counter-attack unmanned aerial vehicle (UAV), the counter-attack UAV being separable from the projectile and comprising an aerial vehicle countermeasure,
wherein at least one of the projectile or the counter-attack unmanned aerial vehicle is operable to receive command data from an aerial vehicle detection system upon detection of a target aerial vehicle while in flight, the aerial vehicle detection system comprising at least one detection sensor operable to detect the target aerial vehicle,
wherein, based on the command data, the projectile is operable to be launched by a projectile launching mechanism,
wherein the first housing section and the second housing section are separable from one another to release the counter-attack UAV from the inner chamber at a particular geolocation relative to the target aerial vehicle in response to the command data, and
wherein upon release of the counter-attack UAV from the projectile, the counter-attack UAV is operable to neutralize the target aerial vehicle with the aerial vehicle countermeasure.

44. A system for neutralizing a target aerial vehicle, comprising:
an aerial vehicle detection system comprising
at least one detection sensor operable to detect a target aerial vehicle while in flight; and
at least one transceiver operable to electronically communicate with at least one of a projectile launching mechanism, a projectile launchable by the projectile launching mechanism, or a counter-attack unmanned aerial vehicle (UAV) supported by and separable from the projectile and comprising an aerial vehicle countermeasure,
wherein the aerial vehicle detection system is operable, in response to the detection, to provide command data to at least one of the launching mechanism or the counter-attack UAV to facilitate neutralization of the target aerial vehicle,
wherein the projectile is formed from at least a first housing section and a second housing section releasably coupled to each other and defining an inner chamber that contains the counter-attack UAV,
wherein, based on the command data, the projectile launching mechanism is operable to launch the projectile,
wherein the first housing section and the second housing section are separable from one another to release the counter-attack UAV from the inner chamber at a particular geolocation relative to the target aerial vehicle in response to the command data, and
wherein upon release of the counter-attack UAV from the projectile, the counter-attack UAV is operable to neutralize the target aerial vehicle with the aerial vehicle countermeasure.

45. A system for neutralizing a target aerial vehicle, comprising:
a projectile launching mechanism;
a projectile launchable by the projectile launching mechanism, the projectile being formed from at least a first housing section and a second housing section releasably coupled to each other and defining an inner chamber operable to support a counter-attack unmanned aerial vehicle (UAV) therein; and
an aerial vehicle detection system comprising at least one detection sensor operable to detect a target aerial vehicle while in flight, and operable, in response to the detection, to provide command data to at least one of the launching mechanism, the projectile, or the counter-attack UAV to facilitate neutralization of the target aerial vehicle,
wherein, based on the command data, the projectile launching mechanism is operable to launch the projectile,
wherein the first housing section and the second housing section are separable from one another to release the counter-attack UAV from the inner chamber at a particular geolocation relative to the target aerial vehicle in response to the command data to neutralize the target aerial vehicle.

* * * * *